United States Patent
Warrow

(10) Patent No.: US 7,156,986 B2
(45) Date of Patent: Jan. 2, 2007

(54) SELF-CLEANSING MEDIA FOR ROTATING BIOLOGICAL CONTACTORS

(76) Inventor: Theodore U. Warrow, 24801 Union St., Dearborn, MI (US) 48124

( * ) Notice: Subject to any disclaimer, the term of this patent is extended or adjusted under 35 U.S.C. 154(b) by 48 days.

(21) Appl. No.: 10/997,117

(22) Filed: Nov. 24, 2004

(65) Prior Publication Data

US 2005/0133444 A1   Jun. 23, 2005

Related U.S. Application Data

(60) Provisional application No. 60/525,642, filed on Nov. 26, 2003.

(51) Int. Cl.
C02F 3/08 (2006.01)

(52) U.S. Cl. .................. 210/150; 200/619; 261/92

(58) Field of Classification Search ............... 210/150, 210/151, 619; 261/92, DIG. 72
See application file for complete search history.

(56) References Cited

U.S. PATENT DOCUMENTS

| | | | |
|---|---|---|---|
| 1,811,181 A | 6/1931 | Maltby | |
| 1,947,777 A | 2/1934 | Huff et al. | |
| 3,335,081 A | 8/1967 | Naggar | |
| 3,484,836 A | 12/1969 | Welch | |
| 3,630,366 A | 12/1971 | Joost | |
| 3,645,510 A | 2/1972 | Klugman | |
| 3,704,783 A | 12/1972 | Antonie | |
| 3,904,525 A * | 9/1975 | Rosenberg | 210/150 |
| 3,915,854 A | 10/1975 | Torpey | |
| 4,115,268 A | 9/1978 | Thissen | |
| 4,137,172 A | 1/1979 | Sako et al. | |
| 4,275,019 A | 6/1981 | Bednarski | |
| 4,345,997 A | 8/1982 | McConnell, Jr. et al. | |
| 4,385,987 A * | 5/1983 | McGinley et al. | 210/150 |
| 4,399,031 A * | 8/1983 | Imano et al. | 210/150 |
| 4,431,537 A | 2/1984 | Hirota | |
| 4,444,658 A | 4/1984 | Hankes et al. | |
| 4,537,678 A | 8/1985 | Thissen | |
| 4,549,962 A | 10/1985 | Koelsch | |
| 4,608,162 A * | 8/1986 | Hankes et al. | 210/150 |
| 4,692,241 A * | 9/1987 | Nicholson | 210/150 |
| 4,724,593 A | 2/1988 | Lang | |
| 4,737,278 A | 4/1988 | Miller | |
| 4,999,302 A * | 3/1991 | Kahler et al. | 210/619 |
| 5,407,578 A | 4/1995 | Nathwani | |
| 5,419,831 A | 5/1995 | Fuerst et al. | |
| 5,423,978 A | 6/1995 | Snyder et al. | |
| 5,425,874 A | 6/1995 | Gass | |
| 5,458,817 A | 10/1995 | Lang | |

(Continued)

Primary Examiner—Christopher Upton
(74) Attorney, Agent, or Firm—Howard & Howard Attorneys, P.C.

(57) ABSTRACT

A self-cleansing media and systems incorporating the same, for a rotating biological contactor, are described. The media includes a disk having cones extending perpendicularly from the surface thereof. Two or more disks lock together, axially about a rotating central shaft, by connecting cones spaced throughout the disk surface having a socket at their base to receive the top of the corresponding connecting cone on the adjacent disk. The cones, by virtue of their length, space the disks a desired distance. The disks include disk segments that can link to one another along either straight and/or curved portions thereof. The geometry of the media provides free passage of the air and water during each revolution, and while the base disk slices through the air and water, the projecting cones or cylinders enter the air and water perpendicular to the direction of rotation and are washed and cleansed during each rotation.

30 Claims, 20 Drawing Sheets

U.S. PATENT DOCUMENTS

| | | |
|---|---|---|
| 5,498,376 A | 3/1996 | St. Louis et al. |
| 5,637,263 A | 6/1997 | Lang et al. |
| 5,679,253 A | 10/1997 | Fuerst et al. |
| 5,714,097 A | 2/1998 | St. Louis et al. |
| 5,851,636 A | 12/1998 | Lang et al. |
| 5,853,591 A | 12/1998 | Snyder et al. |
| 6,071,593 A | 6/2000 | Lang et al. |
| 6,241,222 B1 | 6/2001 | Lang |
| 6,403,366 B1 | 6/2002 | Kim |
| 6,540,920 B1 | 4/2003 | Bounds et al. |
| 6,783,669 B1 | 8/2004 | Okagawa et al. |

* cited by examiner

SELF-CLEANSING MEDIA FOR ROTATING BIOLOGICAL CONTACTORS

CROSS-REFERENCE TO RELATED APPLICATIONS

The present invention claims priority to U.S. Provisional Patent Application Ser. No. 60/525,642, filed Nov. 26, 2003, the entire specification of which is expressly incorporated herein by reference.

FIELD OF THE INVENTION

The present invention relates generally to rotating biological contactors ("RBC's") used in the field of wastewater treatment, and more particularly to the use of self-cleansing media, and systems incorporating the same, used in conjunction with RBC's.

BACKGROUND OF THE INVENTION

An RBC is typically comprised of a rotating shaft to which is attached a bank, or multiple banks, of media that are then in turn rotated by the shaft. A plurality of parallel support shafts is typically employed to aid in the support of the media. The media is typically located such that about 40 percent of the media is, at any given time, immersed in the wastewater to be cleaned. As the media rotates slowly into and out of the wastewater, microorganisms attach themselves to the media, forming a biomass, and consuming contaminates from the wastewater. As the media rotates into the air above the wastewater tank, the microorganisms biodegrade these contaminates, e.g., into carbon dioxide and water.

Examples of technology related to the treatment of wastewater and other substances can be found with reference to the following U.S. patents listed in the Table, below, the entire disclosures of which are expressly incorporated herein by reference:

TABLE

| U.S. Pat. No. | Inventor(s) | Title |
| --- | --- | --- |
| 1,811,181 | Maltby | Process and Apparatus for Treating Sewage or Other Organic Matters |
| 1,947,777 | Huff et al. | Filling Unit |
| 3,335,081 | El-Naggar | Method of Treatment of Sewage by Bio-Oxidation and Apparatus Therefor |
| 3,484,836 | Welch | Rotating Biological Contactor in Sewer |
| 3,630,366 | Joost | Rotating Biological Waste Treatment System |
| 3,645,510 | Klugman | Grid Member and Wall Formed Therefrom |
| 3,704,783 | Antoine | Apparatus for Treating Sewage |
| 3,915,854 | Torpey | Wastewater Treatment |
| 4,115,268 | Thissen | Waste Water Treatment Rotor |
| 4,137,172 | Sako et al. | Rotating Biological Contactor |
| 4,275,019 | Bednarski | A Modular Heaping-Type Packing Element |
| 4,345,997 | McConnell, Jr. et al. | Media |
| 4,431,537 | Hirota | Revolving Contactors for the Biological Treatment of Waste Water |
| 4,444,658 | Hankes et al. | Rotating Biological Contactor Apparatus |
| 4,537,678 | Thissen | Rotary Biological Contactor |
| 4,549,962 | Koelsch | Rotating Biological Contactor |
| 4,724,593 | Lang | Method and Blank for the Manufacture of High Efficiency Open Volumed Packing Bodies |
| 4,737,278 | Miller | Miniturized Modular Rotating Biological Contactor System |
| 5,407,578 | Nathwani | Waste Water Treatment Process |
| 5,419,831 | Fuerst et al. | Rotating Biological Aquarium Filter System |
| 5,423,978 | Snyder et al. | Rotating Biologic Aquarium Filter System |
| 5,425,874 | Gass | Rotating Contactor Including Cross Flow Media for the Biological Treatment of Waste Water |
| 5,458,817 | Lang | Folding Packing and Method of Manufacture |
| 5,498,376 | St. Louis et al. | Packing |
| 5,637,263 | Lang et al. | Multifold Packing and Method of Forming |
| 5,679,253 | Fuerst et al. | Rotating Biological Aquarium Filter System |
| 5,714,097 | St. Louis et al. | Packing |
| 5,851,636 | Lang et al. | Ceramic Packing With Channels for Thermal and Catalytic Beds |
| 5,853,591 | Snyder et al. | Rotating Biological Aquarium Filter System |
| 6,071,593 | Lang et al. | Ceramic Packing With Channels for Thermal and Catalytic Beds |
| 6,241,222 | Lang | Stacked Packing With Spacing Features |
| 6,403,366 | Kim | Method and Apparatus for Treating Volatile Organic Compounds, Odors, and Biodegradable in Air Emissions |
| 6,540,920 | Bounds et al. | Wastewater Treatment System Utilizing Textile Filter Media |
| 6,783,669 | Okagawa et al. | Rotating Disk Type Sewage Treatment Device |

The microorganisms in typical wastewater normally form a biomass on the media that is about 0.03 inches thick. When the system becomes overloaded, the biomass will typically grow to a thickness of about 0.15 inches. When this occurs, the microorganisms that were the first to attach to the media die because no food or oxygen can get to them. When this occurs over a large enough area, the biomass detaches itself from the media and sloughs off.

Conventional media is typically comprised of planar surfaces that are either flat or folded and are either made of a mesh or a solid sheet. Both the flat and the folded types of media are spaced to provide a path that allows the sloughed biomass (i.e., biomass that has become detached from the media) to be washed out of the media. This is needed to prevent plugging of the system which would reduce the media surface area exposed to contaminates in the wastewater and thus reduce the capacity of the system.

The mesh media, which by its nature must be flat, is also typically very flimsy. Because the mesh is a single flat disk, typically spaced from one another, in order to allow the sloughed biomass to be washed out of the media, the area exposed is typically limited to only about 32 square feet per cubic foot. Also, because the mesh is flimsy, the adjacent disks must be separated by many spacers or one disk will flop against the adjacent disk, reducing the surface area exposed.

Therefore, there exists a need for new and improved media, and systems incorporating the same, for use in conjunction with rotating biological contactors and the like.

SUMMARY OF THE INVENTION

In accordance with the general teachings of the present invention, new and improved media, and systems incorporating the same, for use in conjunction with rotating biological contactors and the like, are provided.

The present invention allows for a significant increase in the surface area of media exposed to the wastewater, as compared to conventional media systems. Without being bound to a particular theory of the operation of the present invention, it is believed that the present invention provides a surface area exposure in the range of about 95 to about 110 square feet per cubic feet of media in the low density first stage.

In accordance with a first embodiment of the present invention, a rotating biological contactor system is provided, comprising: (1) a substantially circular first media disk, comprising: (a) a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on either of the straight edge portions; and (b) a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on either of the straight edge portions, wherein the first and second media segments are operable to be brought into selective engagement by mating of the first and second straight edge portions, wherein an area defining a substantially circular third aperture is formed along a central axis of the first media disk when the first and second media segments are brought into selective engagement; and (2) a substantially circular second media disk, comprising: (a) a third media segment having first and second major faces, the third media segment having a third curved edge portion and a third straight edge portion, the third media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on either of the straight edge portions; and (b) a fourth media segment having first and second major faces, the fourth media segment having a fourth curved edge portion and a fourth straight edge portion, the fourth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on either of the straight edge portions, wherein the third and fourth media segments are operable to be brought into selective engagement by mating of the third and fourth straight edge portions, wherein an area defining a substantially circular sixth aperture is formed along a central axis of the second media disk when the third and fourth media segments are brought into selective engagement, wherein the tip portions of the second plurality of members of the first media disk are operable to be received in the socket portions of the second plurality of members of the second media disk.

In accordance with a second embodiment of the present invention, a rotating biological contactor system is provided, comprising: (1) a substantially circular first media disk, comprising: (a) a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on either of the straight edge portions; (b) a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on either of the straight edge portions; and (c) a third media segment having first and second major faces, the third media segment having a third curved edge portion and a third straight edge portion, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on either of the curved edge portions, wherein the first and second media segments are operable to be brought into selective engagement by mating of the first and second straight edge portions, wherein the third media segment and any of the first and second media segments are operable to be brought into selective engagement by mating of the third curved edge portion with any of the first and second curved edge portions, wherein an area defining a substantially circular third aperture is formed along a central axis of the first media disk when the first and second media segments are brought into selective engagement; and (2) a substantially circular second media disk, comprising: (a) a fourth media segment having first and second major faces, the fourth media segment having a fourth curved edge portion and a fourth straight edge portion, the fourth media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on either of the straight edge portions; (b) a fifth media segment having first and second major faces, the fifth media segment having a fifth curved edge portion and a fifth straight edge portion, the fifth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the fifth media segment having a fifth connection portion formed on either of the straight edge portions; and (c) a sixth media segment having first and second major faces, the sixth media segment having a sixth curved edge portion and a sixth straight edge portion, the first major face having first and second pluralities of members extending therefrom, the second plurality of members having a greater height than the first plurality of members, the second plurality of members having a tip portion and an area defining a socket portion formed in a base portion thereof, the sixth media segment having a sixth connection portion formed on either of the curved edge portions, wherein the third and fourth media segments are operable to be brought into selective engagement by mating of the third and fourth straight edge portions, wherein the sixth media segment and any of the fourth and fifth media segments are operable to be brought into selective engagement by mating of the sixth curved edge portion with any of the fourth and fifth curved edge portions, wherein an area defining a substantially circular sixth aperture is formed along a central axis of the second media disk when the third and fourth media segments are brought into selective engagement, wherein the tip portions of the second plurality of members of the first media disk are operable to be received in the socket portions of the second plurality of members of the second media disk.

In accordance with a third embodiment of the present invention, a rotating biological contactor system is provided, comprising: (1) a substantially circular first media disk, comprising: (a) a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on either of the straight edge portions; (b) a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on either of the straight edge portions; (c) a third media segment having first and second major faces, the third media segment having a third curved edge portion and a third straight edge portion, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on either of the curved edge portions; and (d) a fourth media segment having first and second major faces, the fourth media segment having a fourth curved edge portion and a fourth straight edge portion, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on either of the curved edge portions, wherein the first and second media segments are operable to be brought into selective engagement by mating of the first and second straight edge portions, wherein the third and fourth media segments are operable to be brought into selective engagement by mating of the third and fourth straight edge portions, wherein any of the third and fourth media segments and any of the first and second media segments are operable to be brought into selective engagement by mating of any of the third and fourth curved edge portions with any of the first and second curved edge portions, wherein an area defining a substantially circular third aperture is formed along a central axis of the first media disk when the first and second media segments are brought into selective engagement; and (2) a substantially circular second media disk, comprising: (a) a fifth media segment having first and second major faces, the fifth media segment having a fifth curved edge portion and a fifth straight edge portion, the fifth media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the fifth media segment having a fifth connection portion formed on either of the straight edge portions; (b) a sixth media segment having first and second major faces, the sixth media segment having a sixth curved edge portion and a sixth straight edge portion, the sixth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the sixth media segment having a sixth connection portion formed on either of the straight edge portions; (c) a seventh media segment having first and second major faces, the seventh media segment having a seventh curved edge portion and a seventh straight edge portion, the first major face having first and second pluralities of members extending therefrom, the second plurality of members having a greater height than the first plurality of members, the second plurality of members having a tip portion and an area defining a socket portion formed in a base portion thereof, the seventh media segment having a seventh connection portion formed on either of the curved edge portions; and (d) an eighth media segment having first and second major faces, the eighth media segment having an eighth curved edge portion and an eighth straight edge portion, the first major face having first and second pluralities of members extending therefrom, the second plurality of members having a greater height than the first plurality of members, the second plurality of members having a tip portion and an area defining a socket portion formed in a base portion thereof, the eighth media segment having an eighth connection portion formed on either of the curved edge portions, wherein the fifth and sixth media segments are operable to be brought into selective engagement by mating of the fifth and sixth straight edge portions, wherein the seventh and eighth media segments are operable to be brought into selective engagement by mating of the seventh and eighth straight edge portions, wherein any of the seventh and eighth media segments and any of the fifth and sixth media segments are operable to be brought into selective engagement by mating of any of the seventh and eighth curved edge portions with any of the fifth and sixth curved edge portions, wherein an area defining a substantially circular sixth aperture is formed along a central axis of the second media disk when the third and fourth media segments are brought into selective engagement, wherein the tip portions of the second plurality of members of the first media disk are operable to be received in the socket portions of the second plurality of members of the second media disk.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
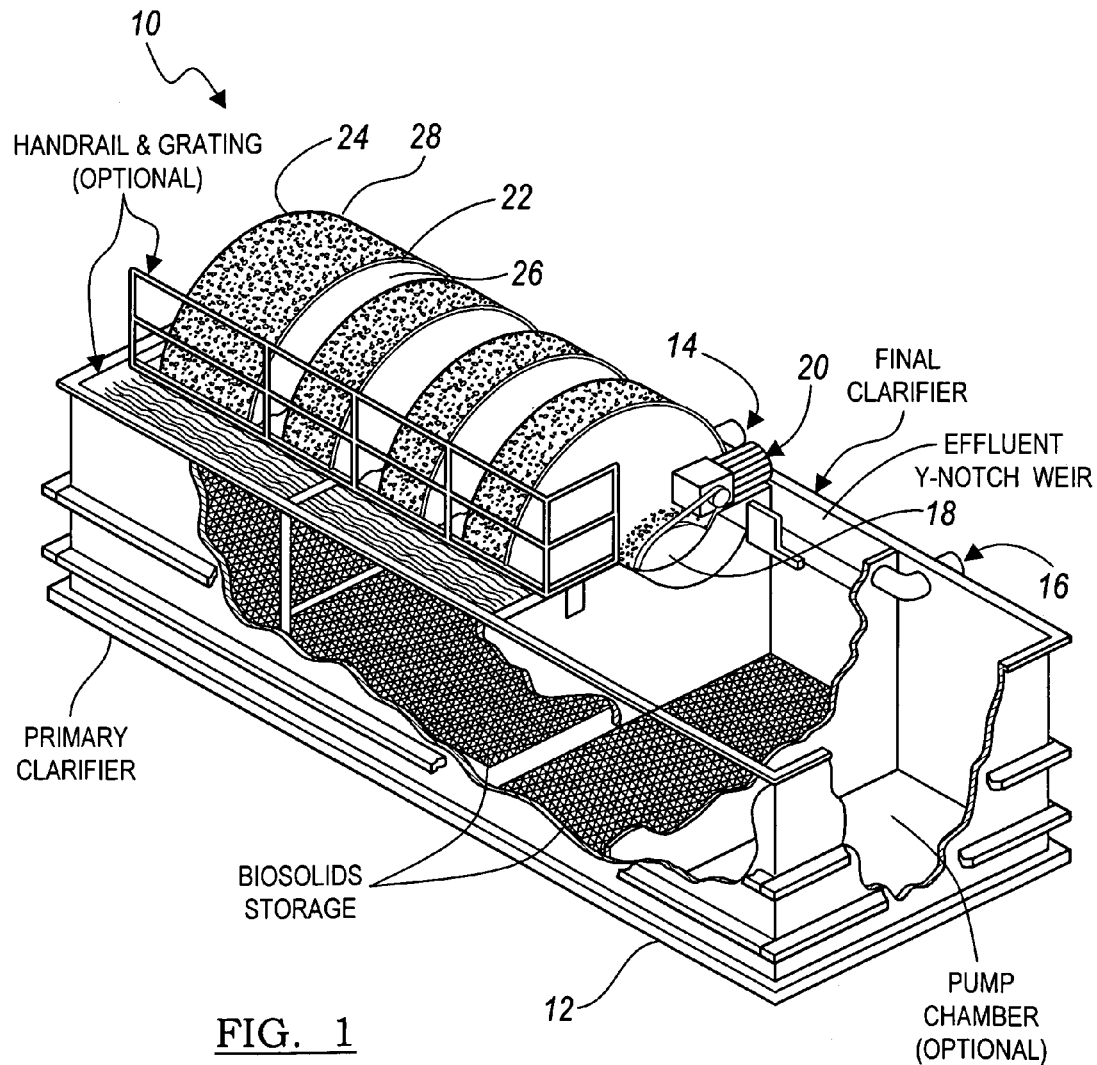
FIG. 1 is a partial perspective view of a rotating biological contactor system, in accordance with the general teachings of the present invention.
Figure 2:
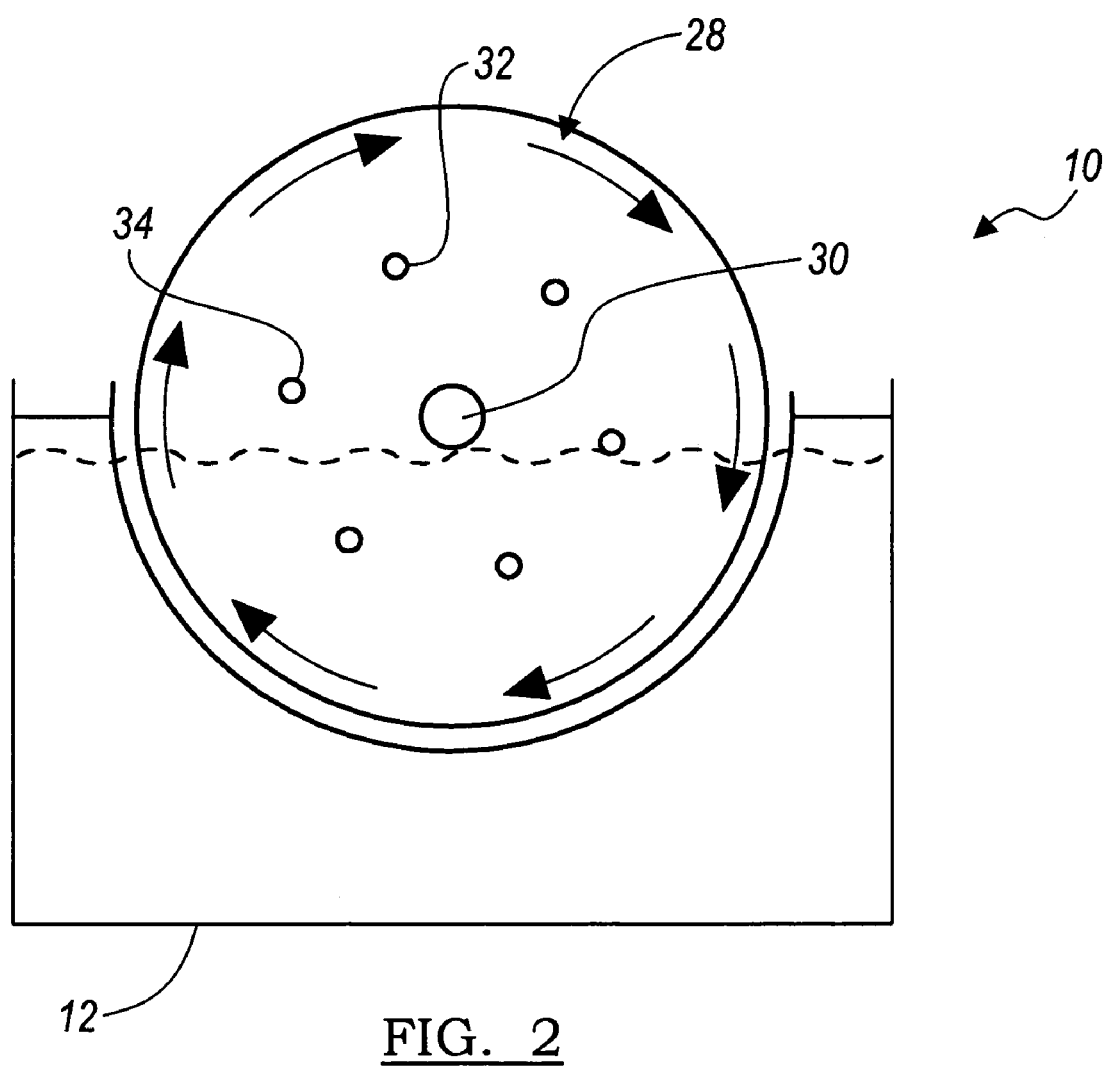
FIG. 2 is a sectional view of a rotating biological contactor system, in accordance with the general teachings of the present invention.
Figure 3:
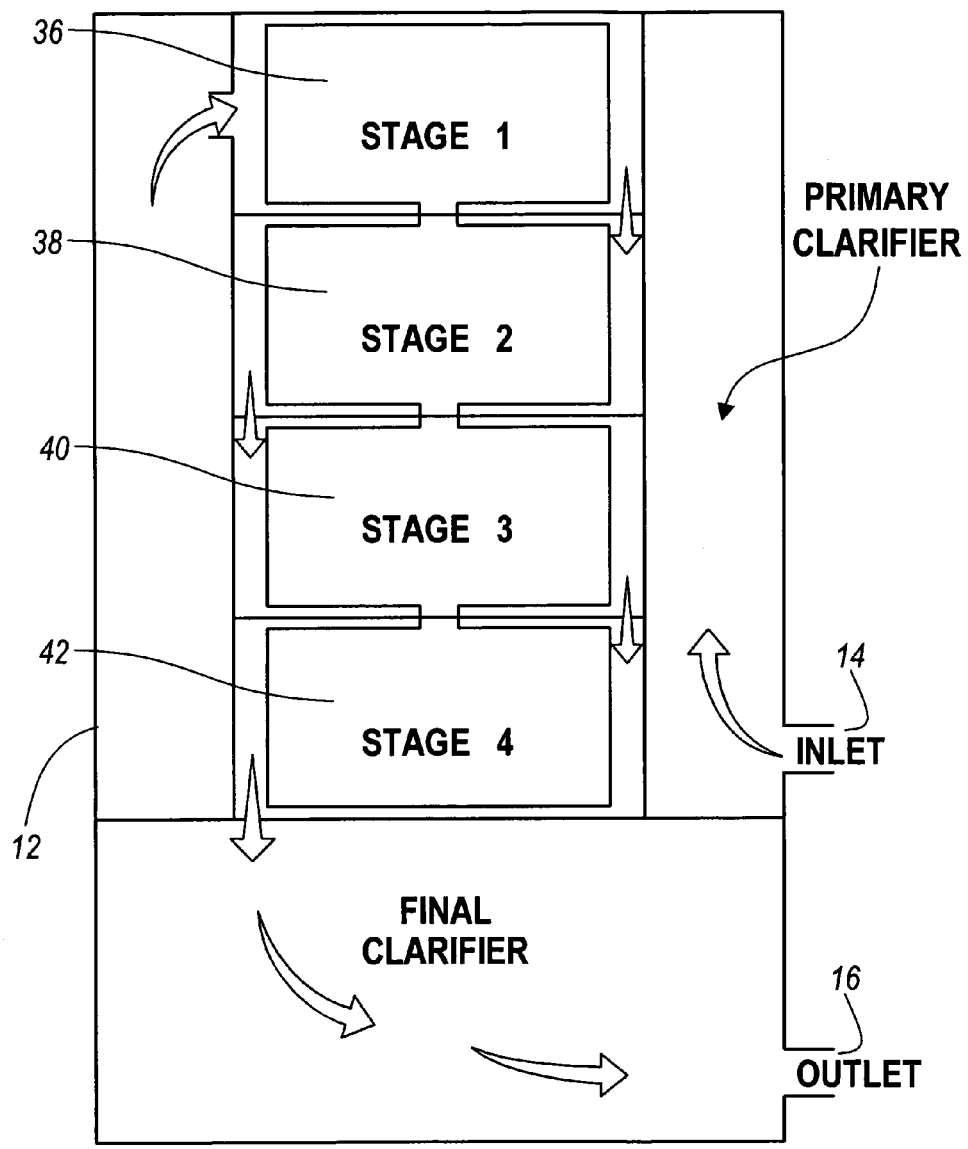
FIG. 3 is a schematic view of a rotating biological contactor system, in accordance with the general teachings of the present invention.
Figure 4:
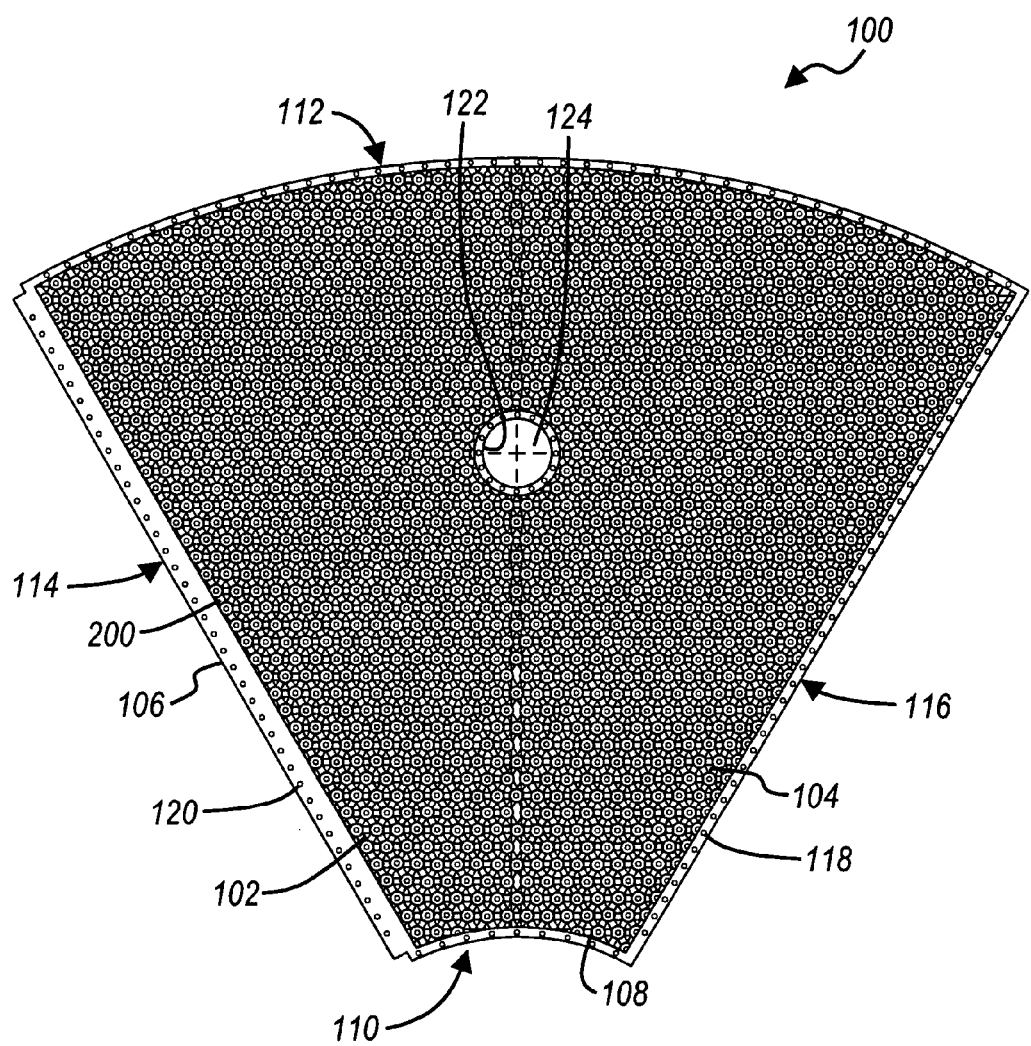
FIG. 4 is a plan view of a segment of a media element, in accordance with one embodiment of the present invention.
Figure 5:
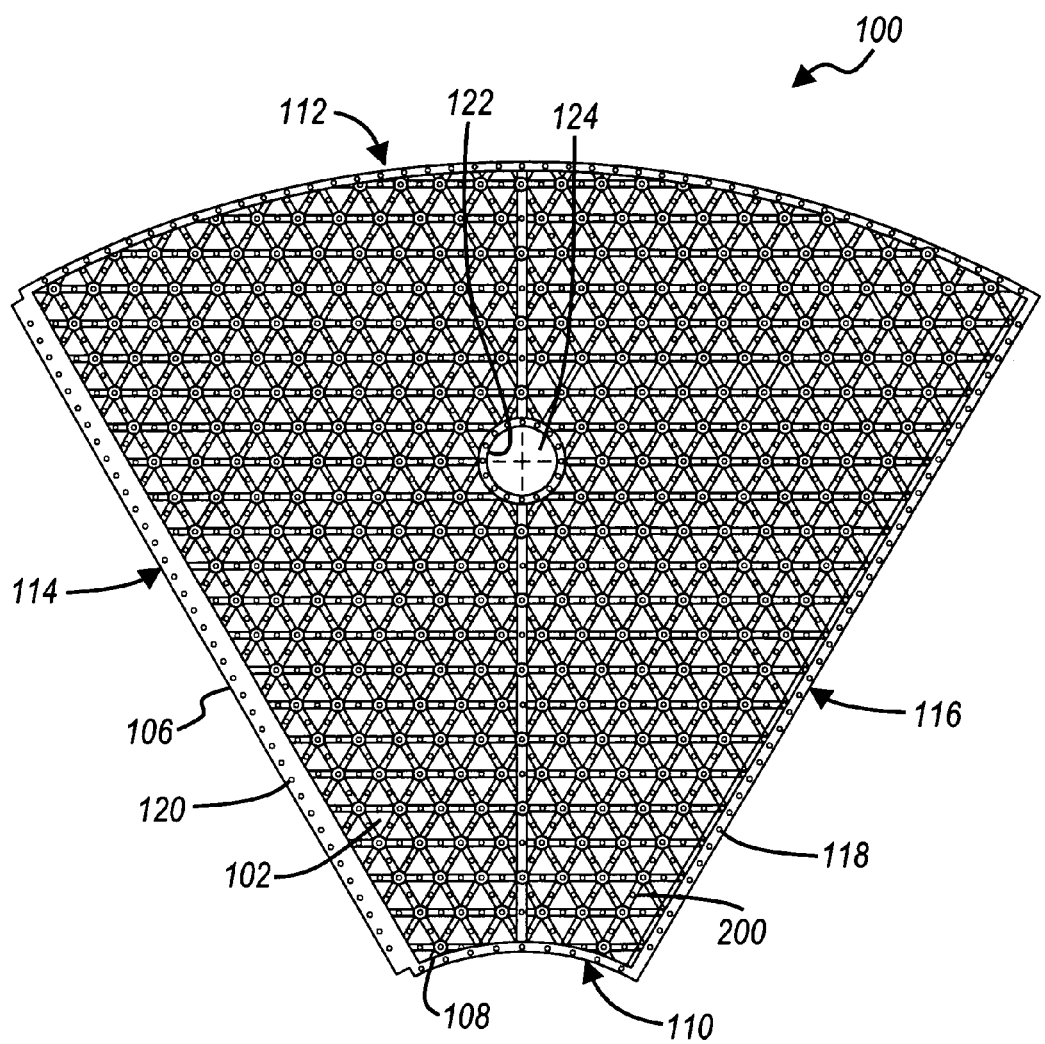
FIG. 5 is a plan view of the media element depicted in FIG. 4, showing only the support grid needed to hold the projecting elements in place, in accordance with one embodiment of the present invention.
Figure 6:
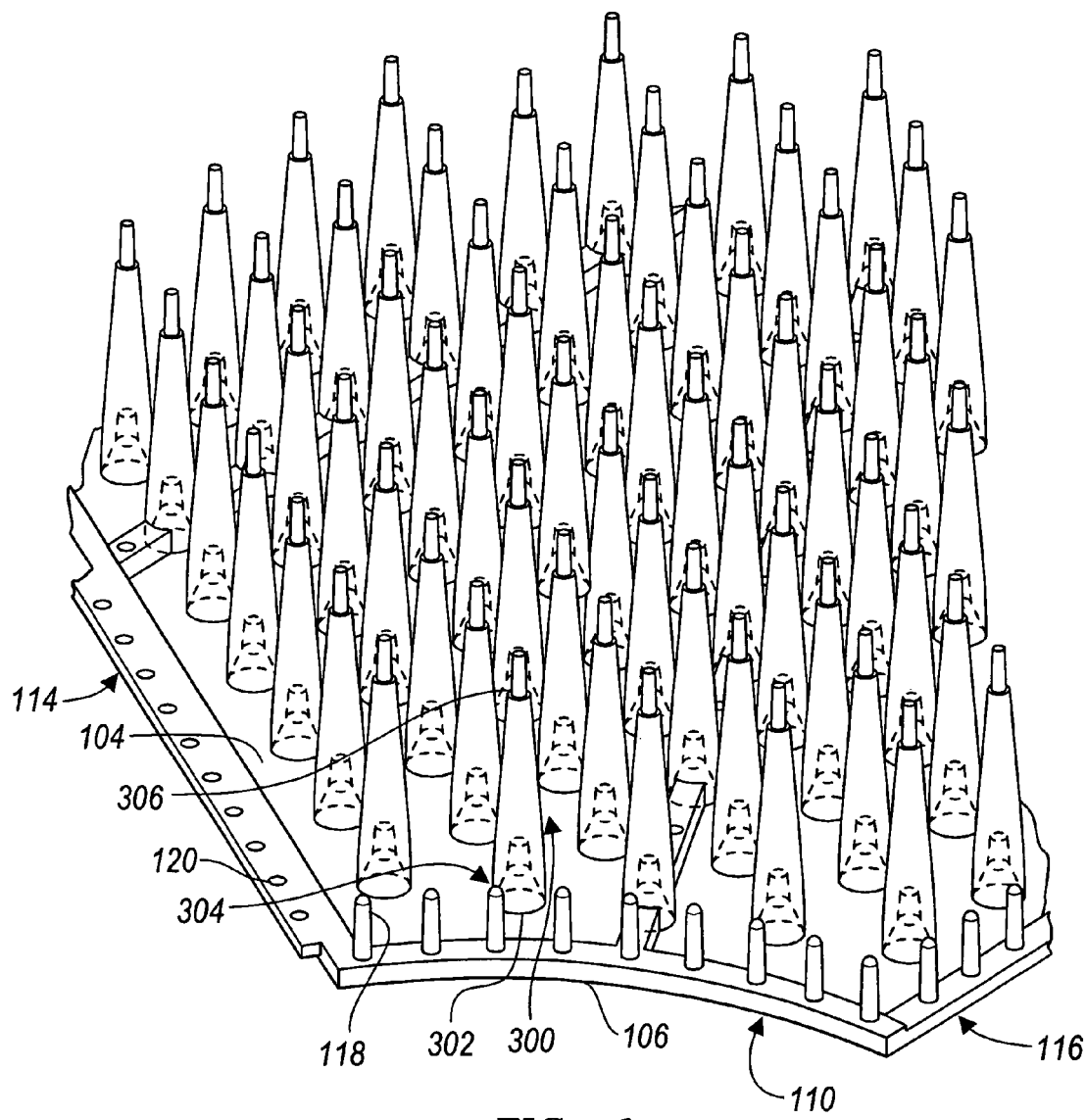
FIG. 6 is a partial perspective view of the inside rim of the media element depicted in FIG. 4, wherein for clarity only the disk connecting members and the element connecting members are shown along with the structural grid, in accordance with one embodiment of the present invention.
Figure 7:
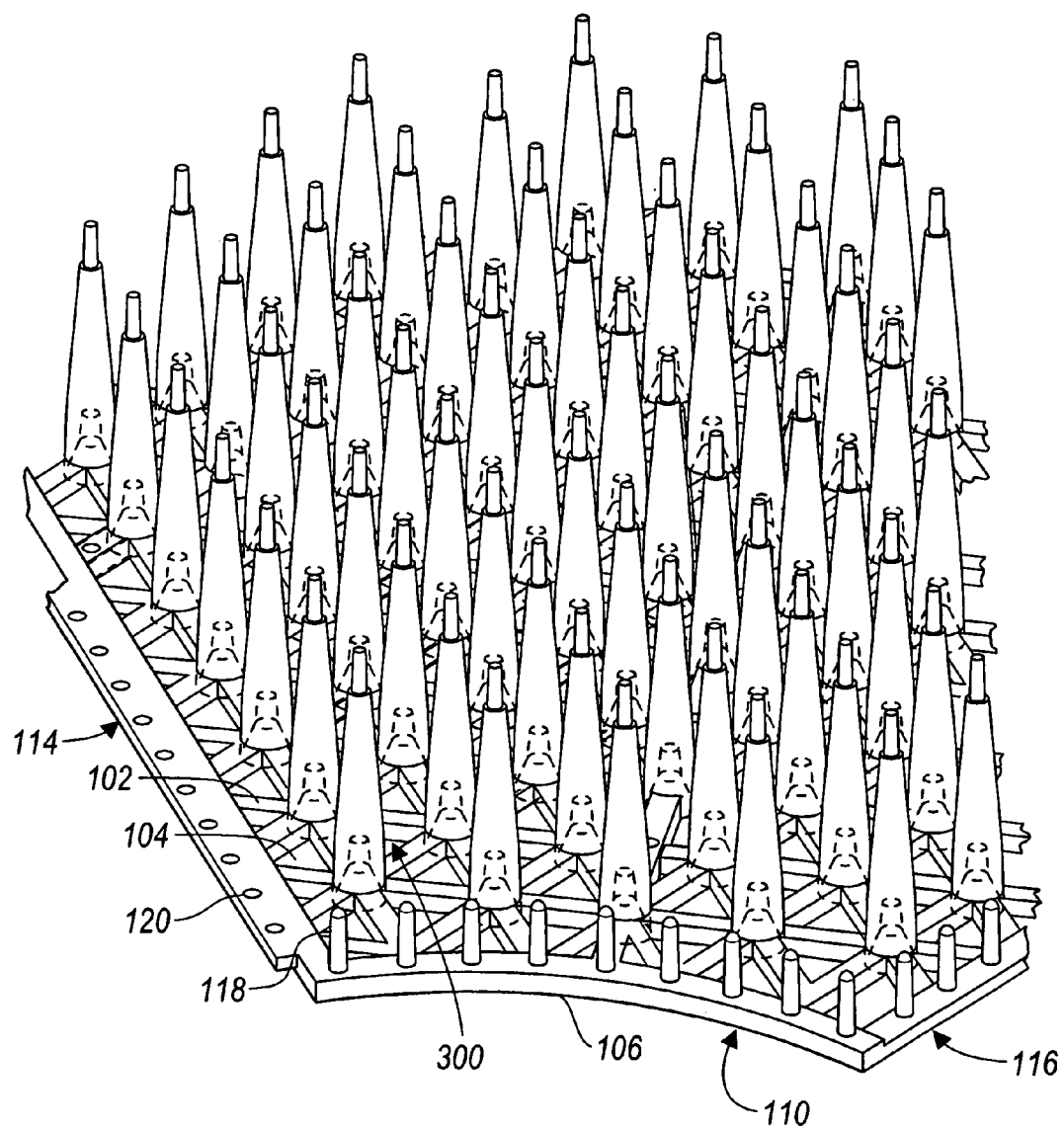
FIG. 7 is the same view as FIG. 6 with the projection support grid added thereto, in accordance with one embodiment of the present invention.
Figure 8:
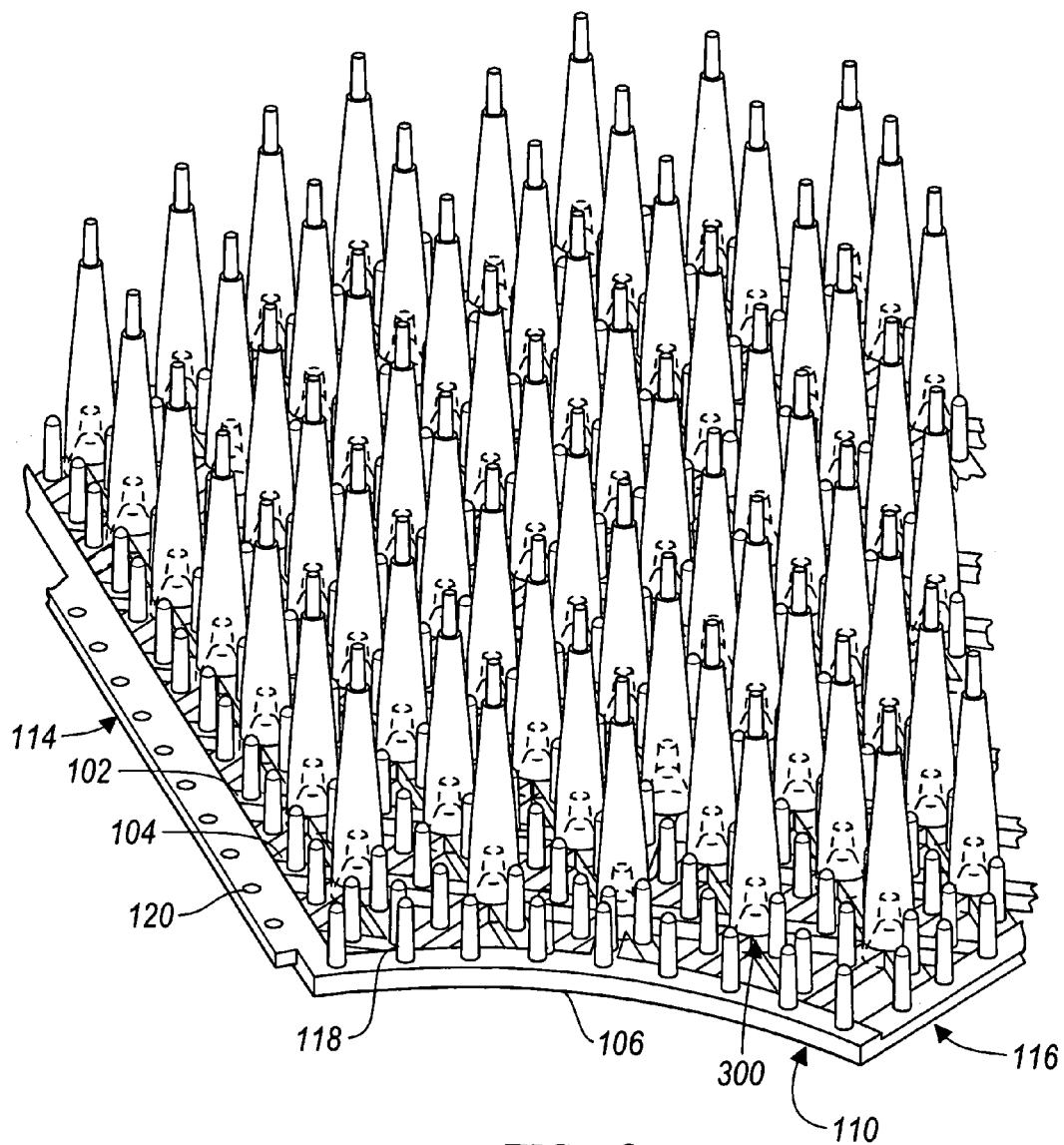
FIG. 8 is the same view as FIGS. 6 and 7, with all of the projecting elements shown, in accordance with one embodiment of the present invention.
Figure 9:
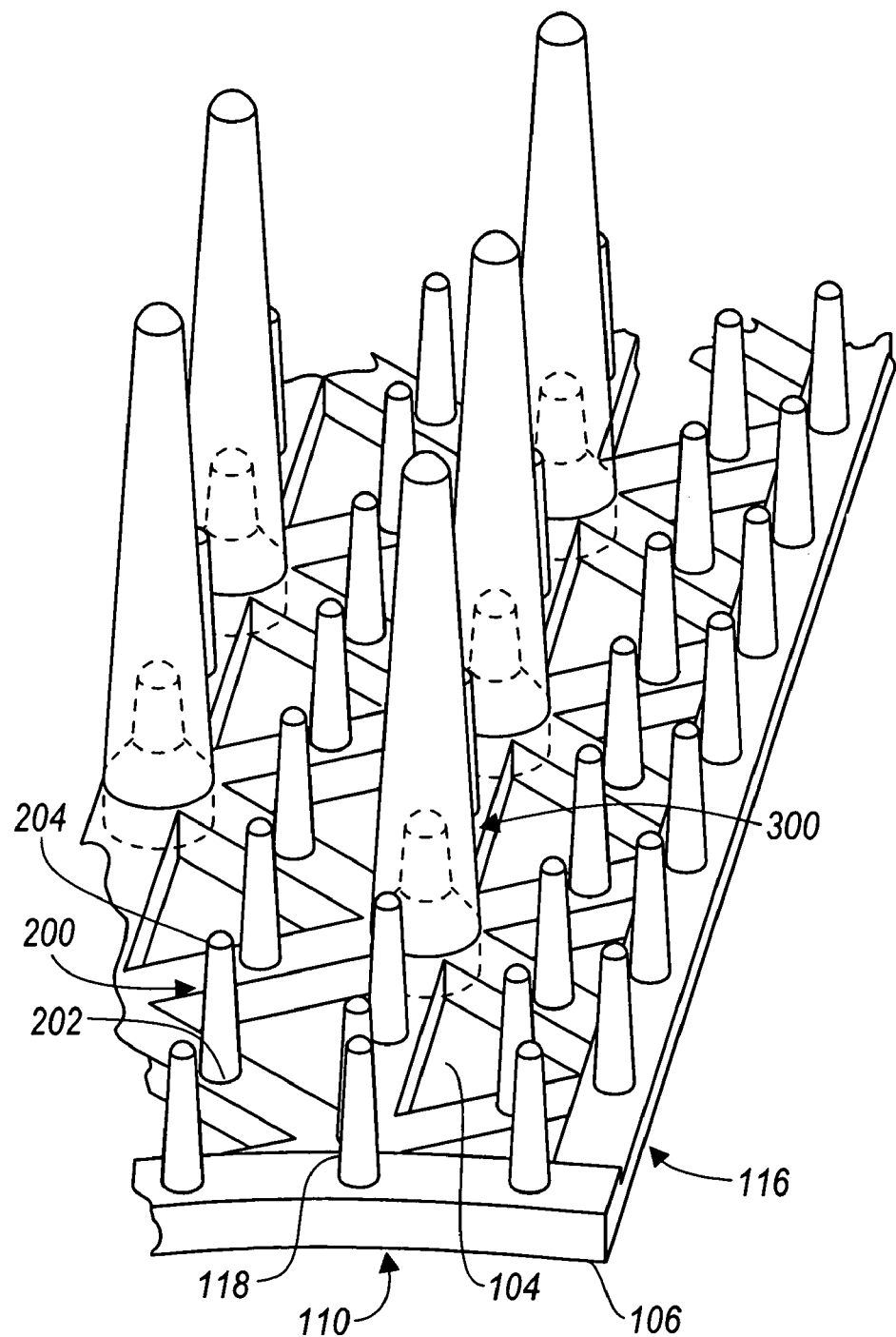
FIG. 9 is a partial perspective view of the media element depicted in FIG. 4, wherein a media element connection portion is shown with the media element connecting members being shown on the edge, in accordance with one embodiment of the present invention.
Figure 10:
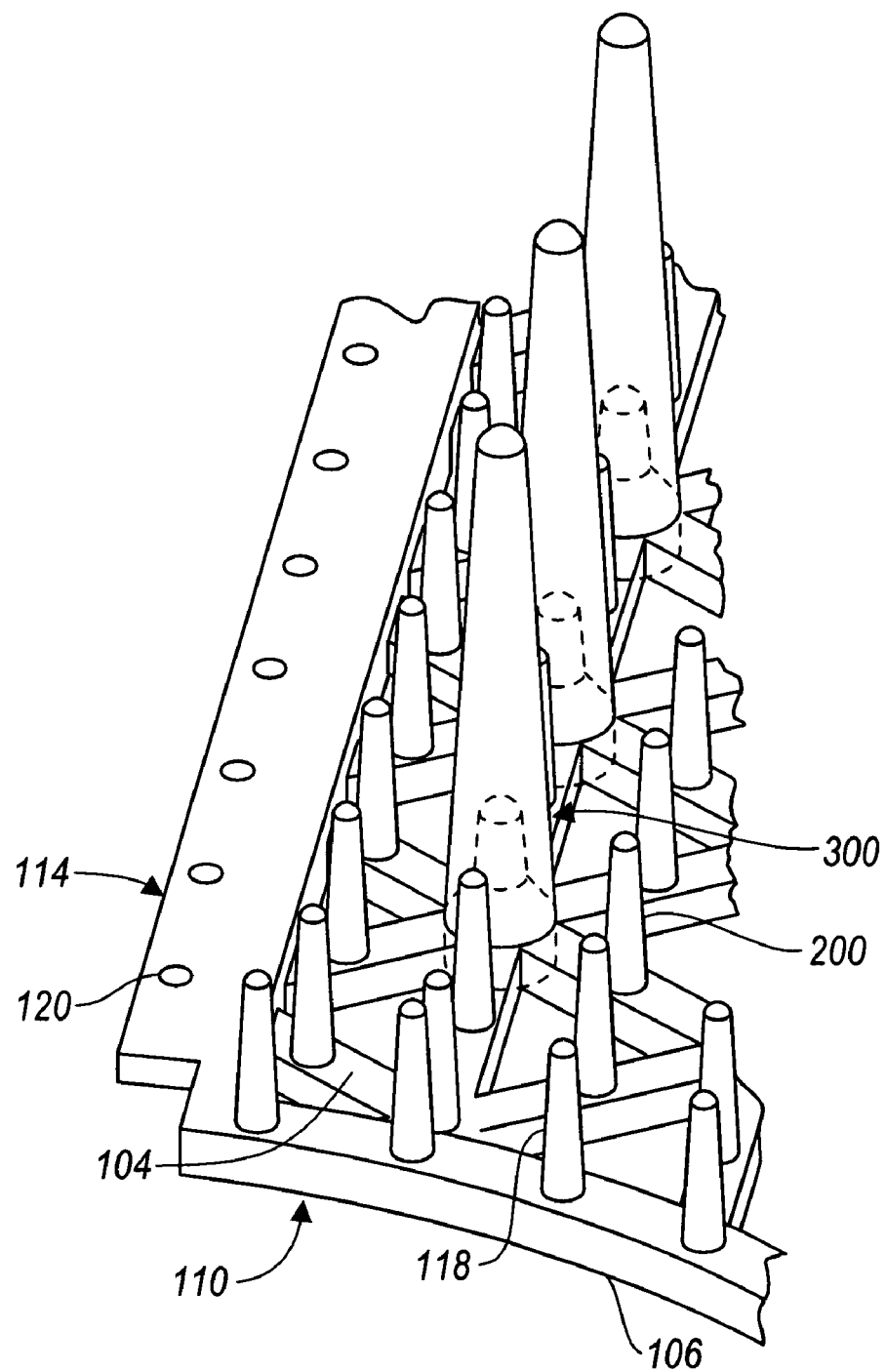
FIG. 10 is a partial perspective view of the media element depicted in FIG. 4, wherein a media element connection portion is shown with the media element connecting member receiving apertures being shown on the edge, in accordance with one embodiment of the present invention.

Referring to the drawings generally, and specifically to FIGS. 1–3, there is shown a rotating biological contactor system at 10. The system 10 preferably includes a tank 12, suitable for holding a desired amount of wastewater, having a fluid inlet 14 (e.g., for introducing untreated wastewater into the tank 12) and a fluid outlet 16 (e.g., for allowing treated wastewater to be removed from the tank 12). A selectively rotatable rotation shaft 18 is preferably provided, as well as a system 20 for rotating and/or controlling the rotation of the rotation shaft 18. Although the rotation shaft 18 is shown as being substantially cylindrical, it should be appreciated that other configurations can be used in the practice of the present invention, such as but not limited to squares, rectangles, triangles, ovals, and the like.

Disposed about the rotation shaft 18, are preferably at least one, and still more preferably, a plurality of media banks 22. Although four media banks 22 are shown, it should be appreciated that either less than or more than this number can be used in the practice of the present invention. Each media bank 22 is preferably comprised of a pair of end plates 24, 26, respectively, that envelope or "bookend" at least one, and still more preferably a plurality, of media disks 28. By "end plate," as that phrase is used herein, it is meant any member or members that are operable to contain the media disks 28.

The media disks 28 are preferably comprised of a substantially rigid material, such as but not limited to plastic materials that are configured in substantially planar shapes. By "substantially rigid material," as that phrase is used herein, it is meant any material that will not easily bend, flop, sag, fold, or otherwise cause the media disks 28 to undesirably contact one another. By "substantially planar shapes," as that phrase is used herein, it is meant any shape that while being predominately planar can also contain projections extending from a major face thereof.

The media disks 28 are preferably provided with respective centrally located apertures 30 formed therein to receive the rotation shaft 18. Although the apertures 30 are shown as being substantially cylindrical, it should be appreciated that other configurations can be used in the practice of the present invention, such as but not limited to squares, rectangles, triangles, ovals, and the like.

The media disks 28 preferably also include additional parallel apertures 32, spaced from the central aperture 30, that are operable to receive respective support shafts 34 (which are preferably secured to the end plates 24, 26, respectively), thus allowing the media disks 28 to be sufficiently secured within the end plates 24, 26, respectively. Although the apertures 32 are shown as being substantially cylindrical, it should be appreciated that other configurations can be used in the practice of the present invention, such as but not limited to squares, rectangles, triangles, ovals, and the like. Although the support shafts 34 are shown as being substantially cylindrical, it should be appreciated that other configurations can be used in the practice of the present invention, such as but not limited to squares, rectangles, triangles, ovals, and the like.

By way of a non-limiting example, once each media bank 22 is assembled, it can then be placed on the rotation shaft 18. In the present views, there are four media banks 22 of varying width, and are generally denominated as stage one 36, stage two 38, stage three 40, and stage four 42, each appropriate for a particular stage of the biodegradation process. Although the media banks 22 are shown with varying widths, it should be appreciated that their respective widths can be modified to suit the particular processing requirements of the respective RBC system.

Once all of the media banks 22 are loaded onto the rotation shaft 18, the system 10 is ready for operation. The media of the present invention is typically located such that about forty percent of the media is immersed in the wastewater to be treated. As various portions of the media banks 22 rotate slowly into and out of the wastewater, microorganisms attach themselves to the media, forming a biomass, and consuming contaminates from the wastewater. As the Media banks 22 rotate into the air above the tank 12, the microorganisms biodegrade these contaminates, e.g., into carbon dioxide and water. It is clear that, the larger the population of microorganisms exposed to the wastewater, the larger the amount of contaminates that can be removed from the wastewater through conventional RBC techniques.

The rotation of the media disks 28 into and through the wastewater applies a combination of shear and impact forces, as specifically shown in FIG. 2. This is due, in part, to the particular effect of the surface projections disposed on the surface of the media disks 28, as will be explained further herein. In this manner, the system 10 of the present invention best utilizes the direction of this applied cleansing force and has the best chance of maintaining design capacity by preventing or at least lessening the plugging of the system 10. Referring generally to the drawings generally, and specifically to FIGS. 4–10, there is shown a media element 100, in accordance with one embodiment of the present invention. It is preferred that the previously described media disks 28 are comprised of at least one, more preferably at least two, and still more preferably a plurality of media elements 100, as will be described herein.

The media element 100 is preferably comprised of a substantially planar wedge-shaped member 102 having a first major face 104 and a second major face 106. The media element 100 preferably includes a discontinuous surface, such as but not limited to a mesh-like grid support member 108. The media element 100 can be comprised of any number of suitable materials, such as but not limited to plastic materials. Preferably, the material chosen is substantially rigid regardless of the configuration of the media element 100 (e.g., solid disk, mesh-like disk or the like).

The member 102 preferably includes at least one, and more preferably at least two curved connection portions 110, 112, respectively, and preferably includes at least one, and more preferably at least two straight connection portions 114, 116, respectively, extending outwardly away parallel to the plane of the member 102. The intended purpose of these connection portions 110, 112, 114, 116, respectively, will be described in detail herein. The connection portions 110, 112, 114, 116, respectively, can be formed on a flange or flange-like structure extending outwardly parallel from the body of the member 102. The degree of curvature of the curved portions will vary, depending, in part, on the exact configuration of the media disk to be assembled.

Any of the connection portions 110, 112, 114, 116, respectively, can be provided with either media element connection members 118 (e.g., cones or the like) or media element connection member receiving apertures 120 (e.g., throughbores or the like). In this manner, the media elements 100 can be connected to any adjacent media element 100, as will be described in detail herein. Additionally, an area defining an aperture 122 can be provided for receiving a support shaft 124.

On the first major face 104, a plurality of outwardly extending projection members 200 are preferably formed thereon, e.g., by blow molding or other suitable processes. These projection members 200 are preferably formed into relatively small diameter cones, rods, cylinders and the like, having base portions 202 and tip portions 204. The first major face 104 preferably lays in a plane perpendicular to the rotation shaft 18 and the projection members 200 are preferably spaced throughout its surface. The location and spacing of the projection members 200 are preferably configured so as to prevent biomass webbing between adjacent projection members 200. By way of a non-limiting example, the intended function of the projection members 200 is to permit microorganisms to attach thereto. It should also be appreciated that the projection members 200 can be angled with respect to the surface of the first major face 104 (i.e., in a non-perpendicular orientation).

Also on the first major face 104, a plurality of outwardly extending disk connection members 300 are preferably formed thereon, e.g., by blow molding or other suitable processes. The disk connection members 300 are preferably formed into relatively larger diameter elongated cones that have socket portions 302 formed in their bases 304. The disk connection members 300 are operable to connect one media disk 28 to another media disk 28 when a tip portion 306 of one media disk 28 is inserted into a corresponding socket portion 302 of an adjacent media disk 28, as will explained in further detail herein. The disk connection members 300 are also intended to function, in part, as a definitive and consistent media disk spacing element and also enable the disk bank 22 to function as a monolithic unit or disk. By way of a non-limiting example, this spacing, which can range from 0.03 inches from the tip portion 204 of the projection members 200 to the face of the next media disk 28 in high density media to 0.5625 inches in low density media, provides a direct path for the sloughed biomass to be washed out of the media banks 22. It should be appreciated that this range is for illustrative purposes only, and is not meant to be limiting.

Figure 11A:
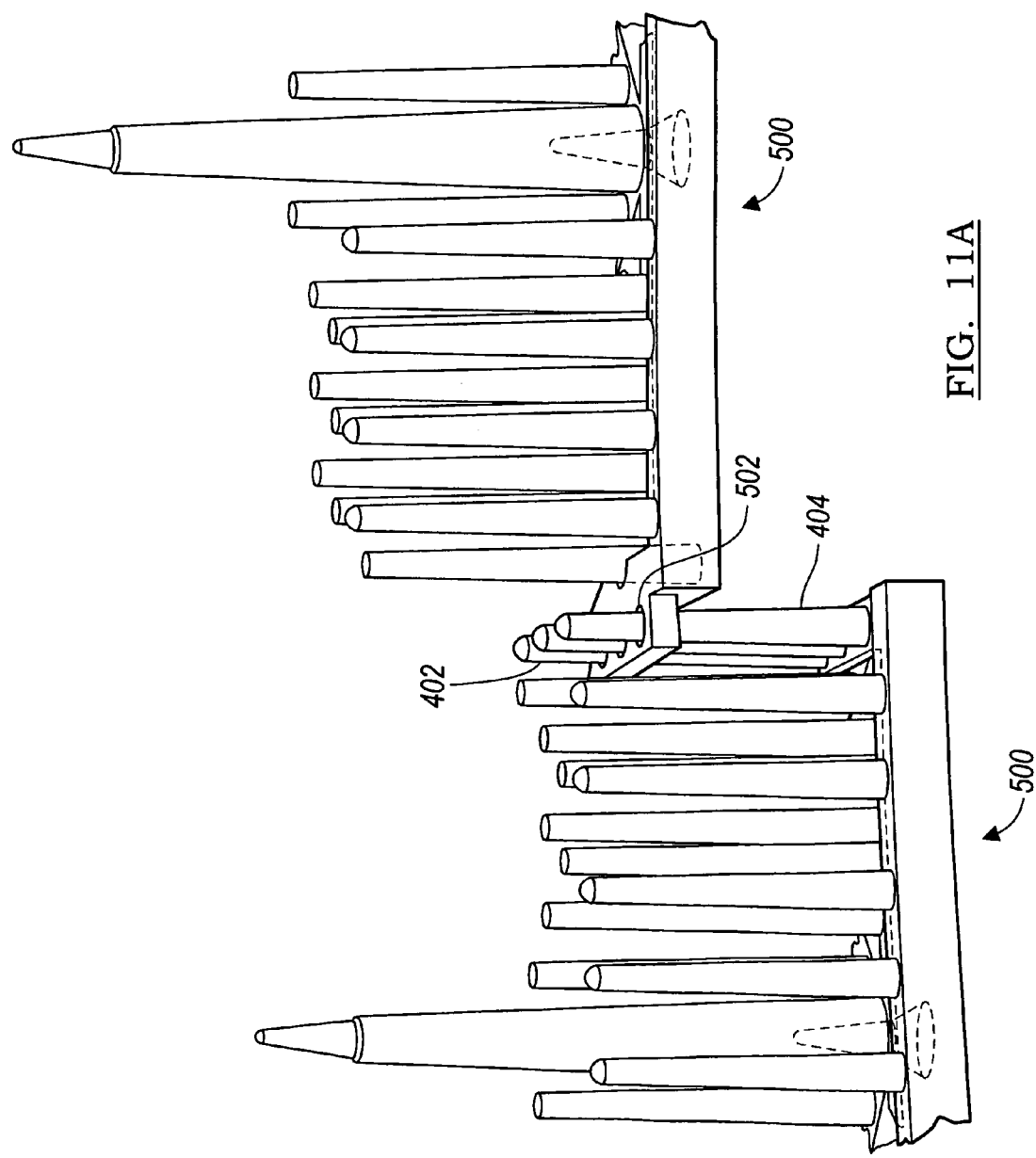
FIGS. 11*a*–11*b* are partial perspective views of the primary steps involved with attaching one media element to an adjacent media element, in accordance with a first alternative embodiment of the present invention.
Figure 11B:
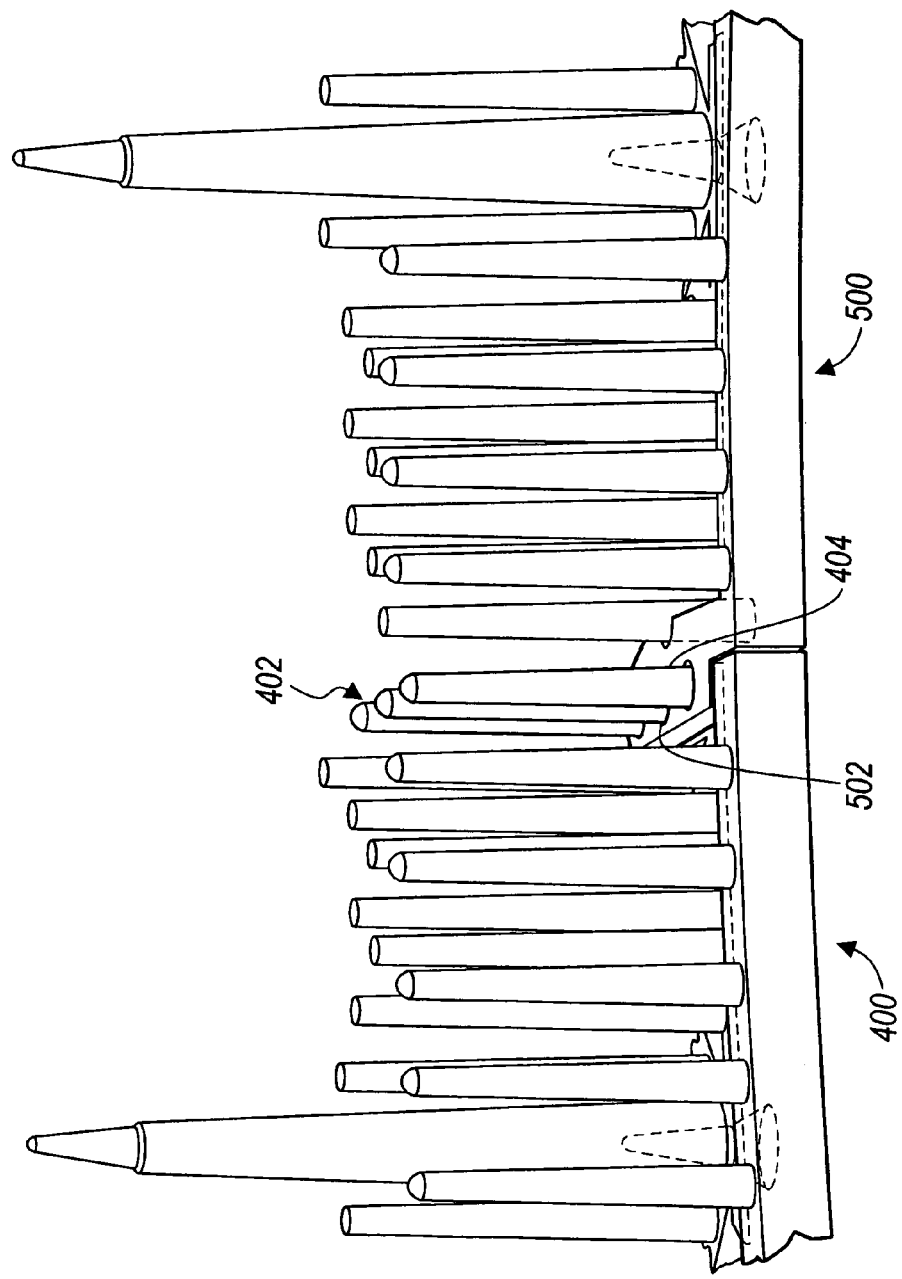
Figure 12:
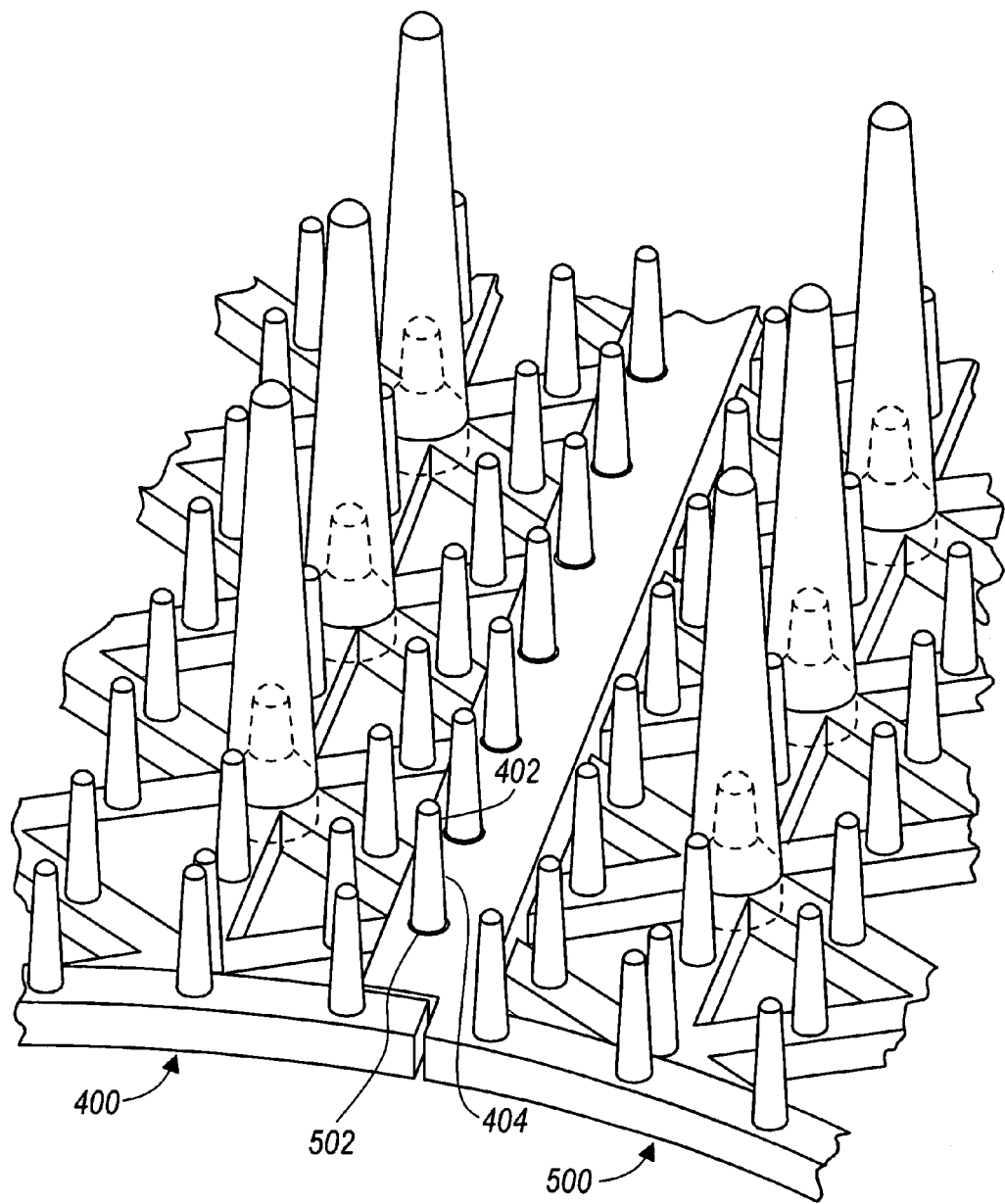
FIG. 12 is a partial perspective view of two adjacent media elements attached together, in accordance with a first alternative embodiment of the present invention.

In order to form a media disk 28 of the present invention, it is preferable to connect at least two, and more preferably, a plurality of the media elements 100 together. Referring to FIGS. 11*a*, 11*b* and 12, there are shown the primary steps involved with attaching one media element 400 to an adjacent media element 500 along an adjacent straight connection portion, in accordance with a first alternative embodiment of the present invention. In FIG. 11*a*, the respective media elements 400, 500, respectively, are manipulated so that media element connection member 402 is introduced into the media element connection member receiving aperture 502. In FIG. 11*b*, the respective media elements 400, 500, respectively, are further manipulated so that media element connection member receiving aperture 502 is brought into a substantially flush arrangement with the surface adjacent to the base portion 404 of the media element connection member 402 so as to form a frictional engagement therebetween. In this manner, the media element 400 can be joined to the media element 500 along an adjacent straight connection portion, as specifically shown in FIG. 12. However, it should be appreciated that the same exact methodology can be used to connect adjacent media elements along an adjacent curved connection portion.

Figure 13:
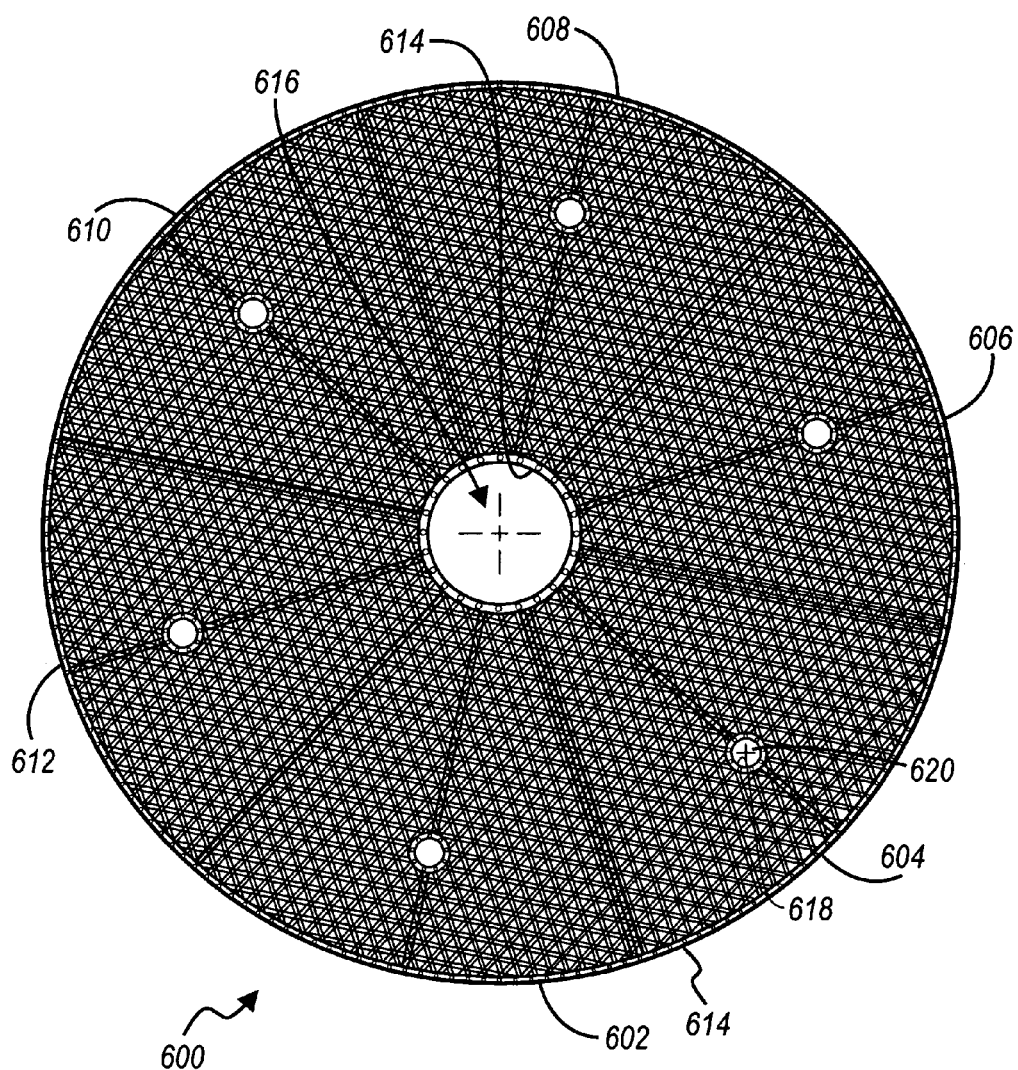
FIG. 13 is a plan view of a three-foot media disk of the present invention fully assembled, wherein for clarity only the projection members, connection members, and grid structure are shown, in accordance with a second alternative embodiment of the present invention.

As more and more of the media elements are assembled together along the straight connection portions thereof, a fully formed media disk 600 is completed, as specifically shown in FIG. 13, in accordance with a second alternative embodiment of the present invention. In this view, a three-foot diameter media disk 300 is shown, however, it should be appreciated that any size media disk could be configured in accordance with the general teachings of the present invention. Additionally, in this view six individual media elements 602, 604, 606, 608, 610, and 612, respectively, are shown comprising the media disk 600. However, it should be appreciated that either less than or more than this number of media elements can be used to form the media disk 600. Additionally, an aperture 614 (for receiving the rotation shaft 616) is formed when all of the requisite number of media elements are brought into engagement as previously described. Furthermore, the apertures 618 formed in the respective media elements, for receiving the corresponding support shafts 620, are also clearly shown.

Figure 14:
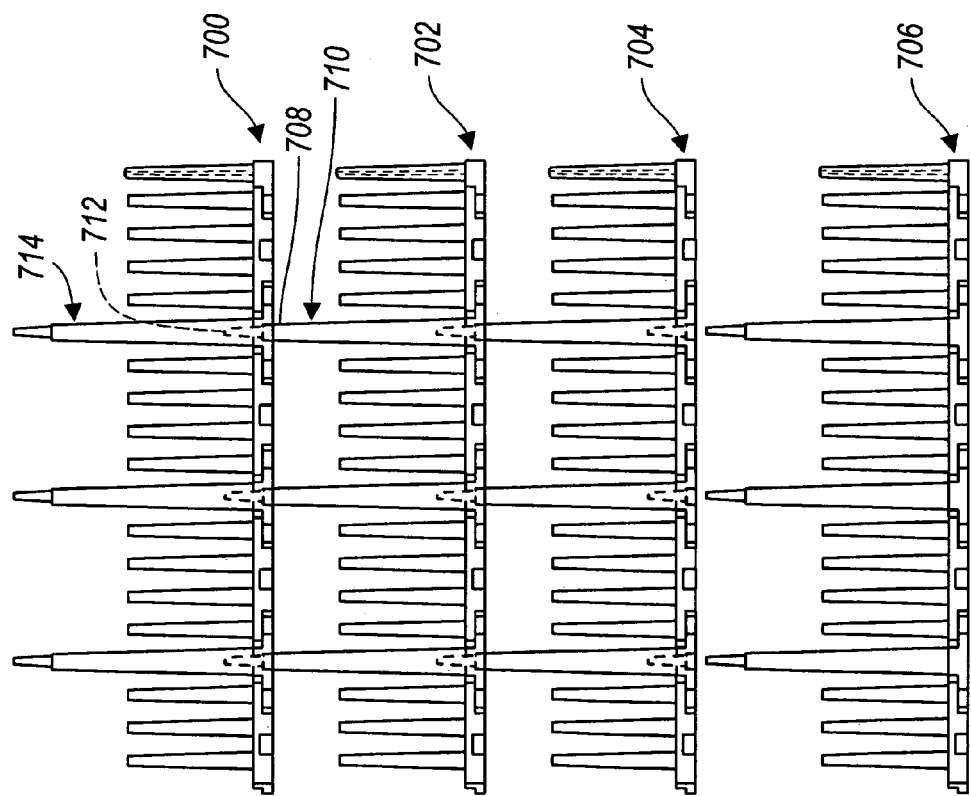
FIG. 14 is a sectional view of four adjacent media elements attached or about to be attached together, in accordance with a third alternative embodiment of the present invention.

Because the Media banks 22 are typically comprised of several, if not dozens or hundreds of individual media disks 28, it is sometimes necessary to connect several adjacent media disks 28 in a manner that will impart stability and rigidity to the media disks 28 as a whole, so as to lessen or eliminate any "floppiness" therein. Referring to FIG. 14, there are shown four adjacent media elements 700, 702, 704, 706, respectively, attached together or about to be attached together, in accordance with a third alternative embodiment of the present invention. As previously noted, attaching one media element to another media element is rather straightforward, and merely requires that the tip portion 708 of a disk connection member 710 of one media element is inserted into the corresponding socket portion 712 of the disk connection member 714 of the adjacent media element. The connection between the tip portion 708 and the socket portion 712 can be a frictional engagement, a snap fit engagement, and the like. Although four media elements are shown in this view, it will be appreciated that any number of media elements can be connected together in accordance with the general teachings of the present invention.

Figure 15:
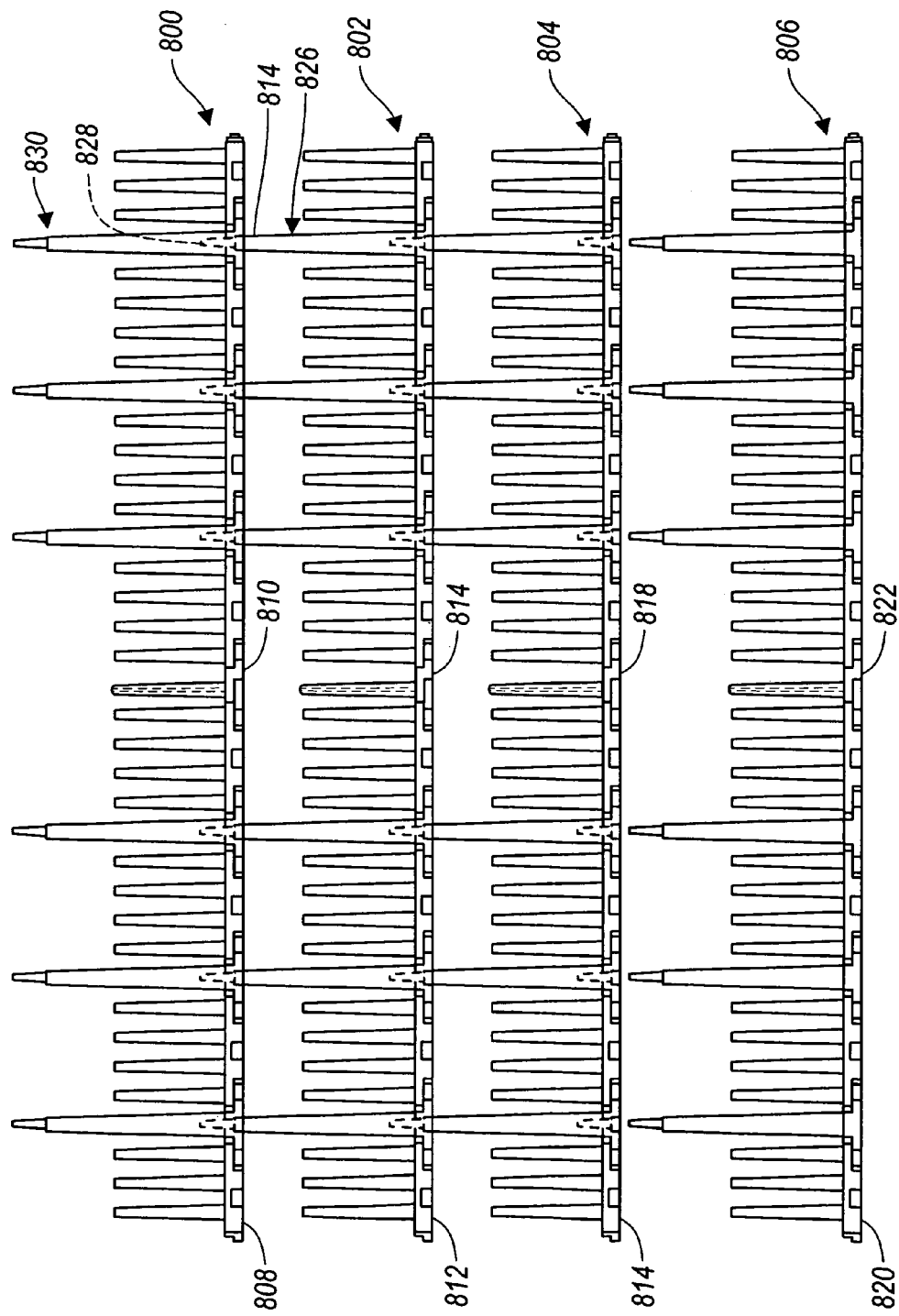
FIG. 15 a sectional view of four adjacent media disks attached or about to be attached together, in accordance with a fourth alternative embodiment of the present invention.

Also as previously noted, because the media banks 22 are typically comprised of several, if not dozens or hundreds of individual media disks 28, it is sometimes necessary to connect several adjacent media disks 28 in a manner that will impart stability and rigidity to the media disks 28 as a whole, so as to lessen or eliminate any "floppiness" therein. Referring to FIG. 15, there are shown four adjacent media disks 800, 802, 804, 806, respectively, attached together or about to be attached together, comprised of eight individual media elements 808, 810, 812, 814, 816, 818, 820, 822, respectively, in accordance with a fourth alternative embodiment of the present invention. As previously noted, attaching one media disk and/or media element to another media disk and/or media element is rather straightforward, and merely requires that the tip portion 824 of a disk connection member 826 of one media element is inserted into the corresponding socket portion 828 of the disk connection member 830 of the adjacent media element. The connection between the tip portion 824 and the socket portion 828 can be a frictional engagement, a snap fit engagement, and the like. Although four media disks are shown in this view, it will be appreciated that any number of media disks can be connected together in accordance with the general teachings of the present invention.

Figure 16:
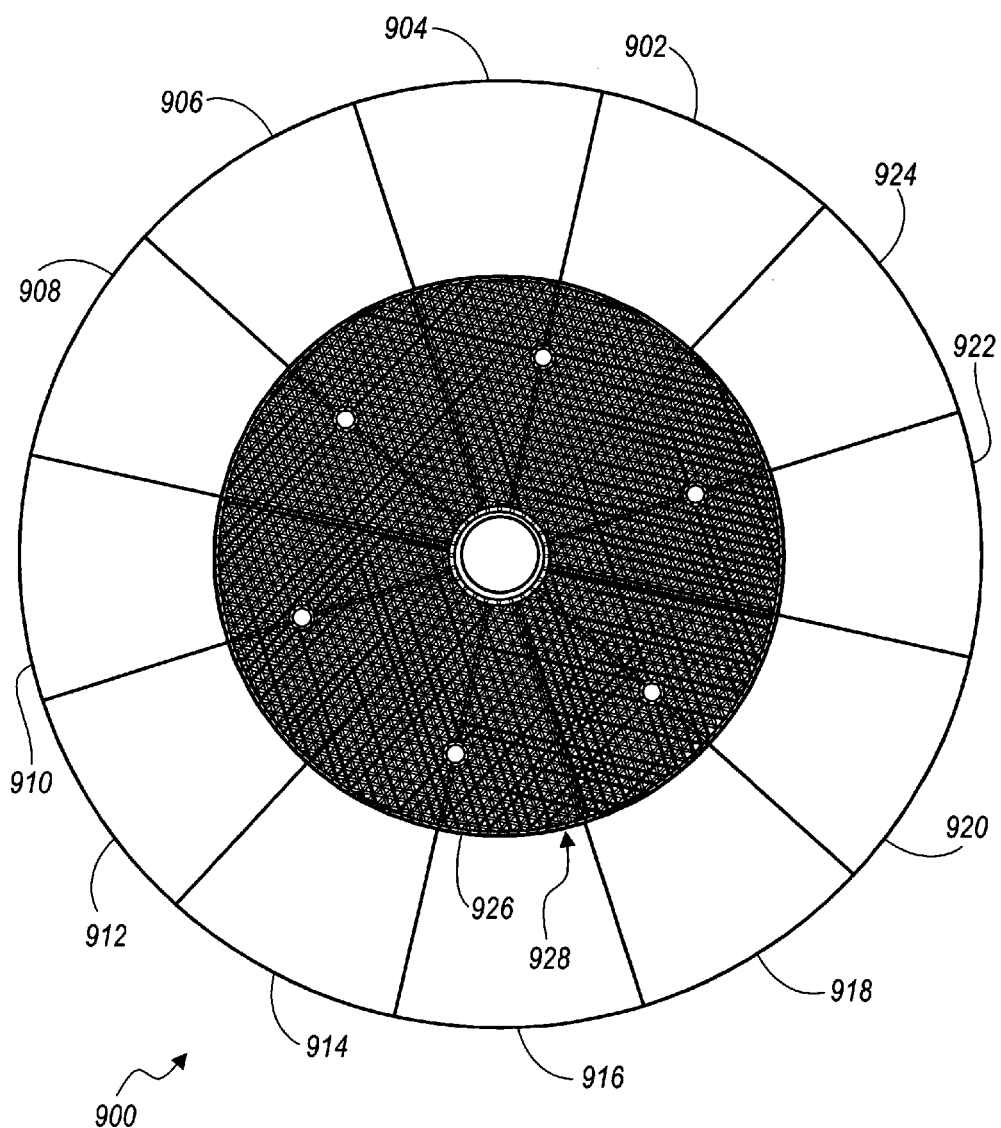
FIG. 16 is a plan view of a six-foot media disk of the present invention using the three foot disk of FIG. 15 and adding representative areas for the three to six foot interlocking media elements, in accordance with a fifth alternative embodiment of the present invention.

Because it is sometimes necessary to provide media disks having relatively larger diameters, e.g., larger than the three-foot media disk depicted in FIG. 13, it is sometimes necessary to connect two or more adjacent media elements together in a manner that will increase the overall diameter of the media disk. Preferably, this should be done in a manner so as to impart stability and rigidity to the media disk as a whole, as well as to lessen or eliminate any "floppiness" therein. Accordingly, these additional media elements should be comprised of materials as previously described. Referring to FIG. 16, there is shown a six-foot media disk 900 of the present invention using a similar three-foot disk similar to that depicted in FIG. 13 and adding representative areas for the three to six foot interlocking media elements 902, 904, 906, 908, 910, 912, 914, 916, 918, 920, 922, 924, respectively, in accordance with a fifth alternative embodiment of the present invention. Of course, the media elements 902, 904, 906, 908, 910, 912, 914, 916, 918, 920, 922, 924, respectively, would be provided with the same type of grid support, segment connection portions, projection members, disk connection members, and the like, as in previously described embodiments, the same being omitted for clarity purposes. The respective media elements are preferably joined along their mating curved connection portions 926, 928, respectively, as described in previous embodiments (e.g., connection members received in corresponding apertures). Additionally, the three to six foot interlocking media elements 902, 904, 906, 908, 910, 912, 914, 916, 918, 920, 922, 924, respectively, can be provided with apertures (not shown for clarity purposes) for receiving support shafts (not shown for clarity purposes).

Figure 17:
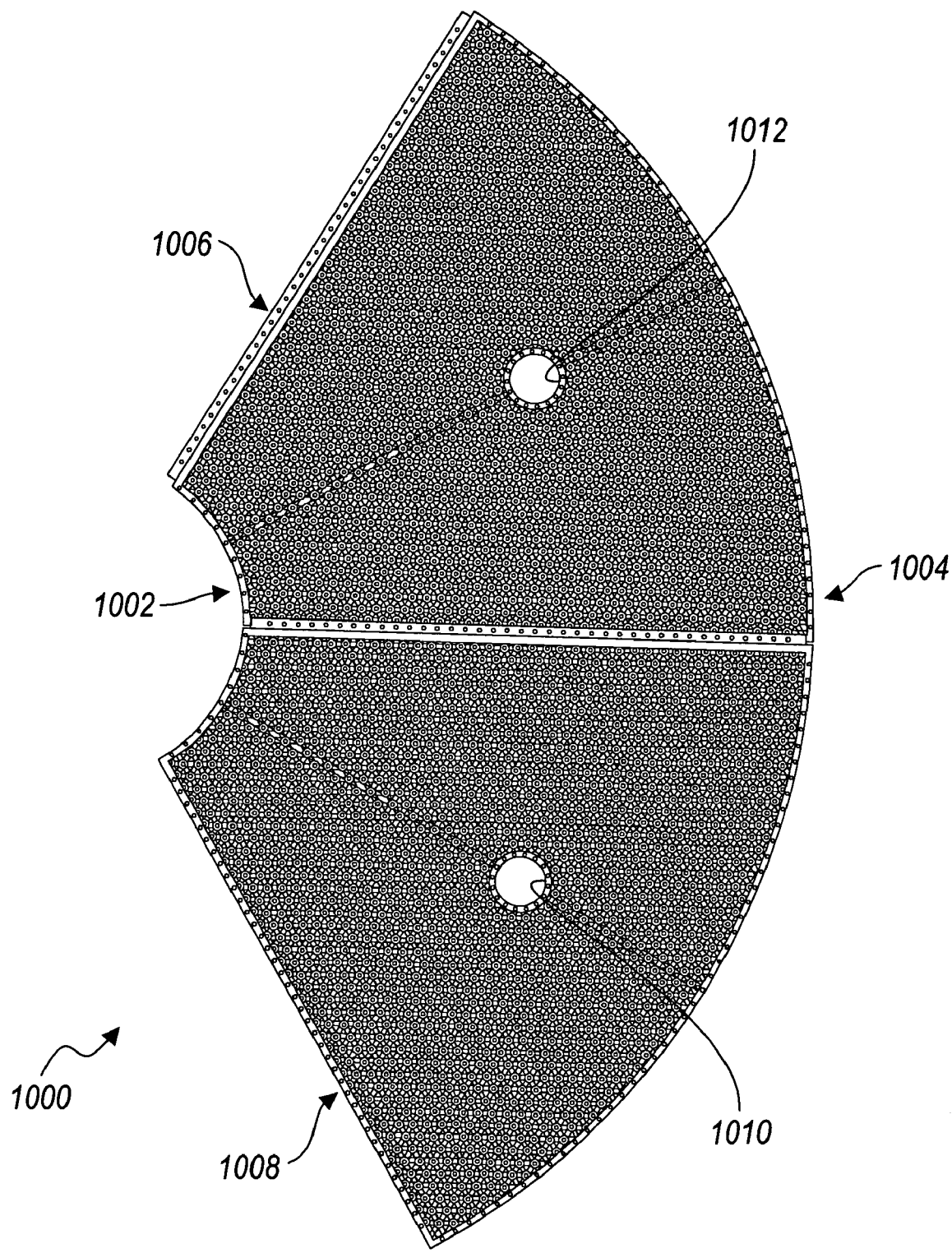
FIG. 17 is a plan view of a three-foot media element, in accordance with a sixth alternative embodiment of the present invention.

Referring to FIG. 17, there is shown a three-foot media element 1000, in accordance with a sixth alternative embodiment of the present invention. This media element 1000 is comprised of a unitary member that is roughly equivalent to two of the media elements depicted in FIG. 4. In this manner, fewer discrete media elements are required to form a media disk (e.g., three media elements versus six media elements). It should be appreciated that the three-foot media element 1000 is preferably configured with two curved connection portions 1002, 1004, respectively, and two straight connection portions 1006, 1008, respectively. In this view, two apertures 1010, 1012, respectively, are provided for accepting any corresponding support shafts. However, it should be appreciated that either less than or more than this number of apertures can be provided. Although the apertures 1010, 1012, respectively, are shown as being substantially cylindrical, it should be appreciated that other configurations can be used in the practice of the present invention, such as but not limited to squares, rectangles, triangles, ovals, and the like. The degree of curvature of the curved connection portions 1002, 1004 will vary, depending, in part, on the exact configuration of the media disk to be assembled. It should be appreciated though, that if multiple rings of media elements are employed, the respective mating curved connection portions should be compatible with respect to their respective curvatures.

Figure 18:
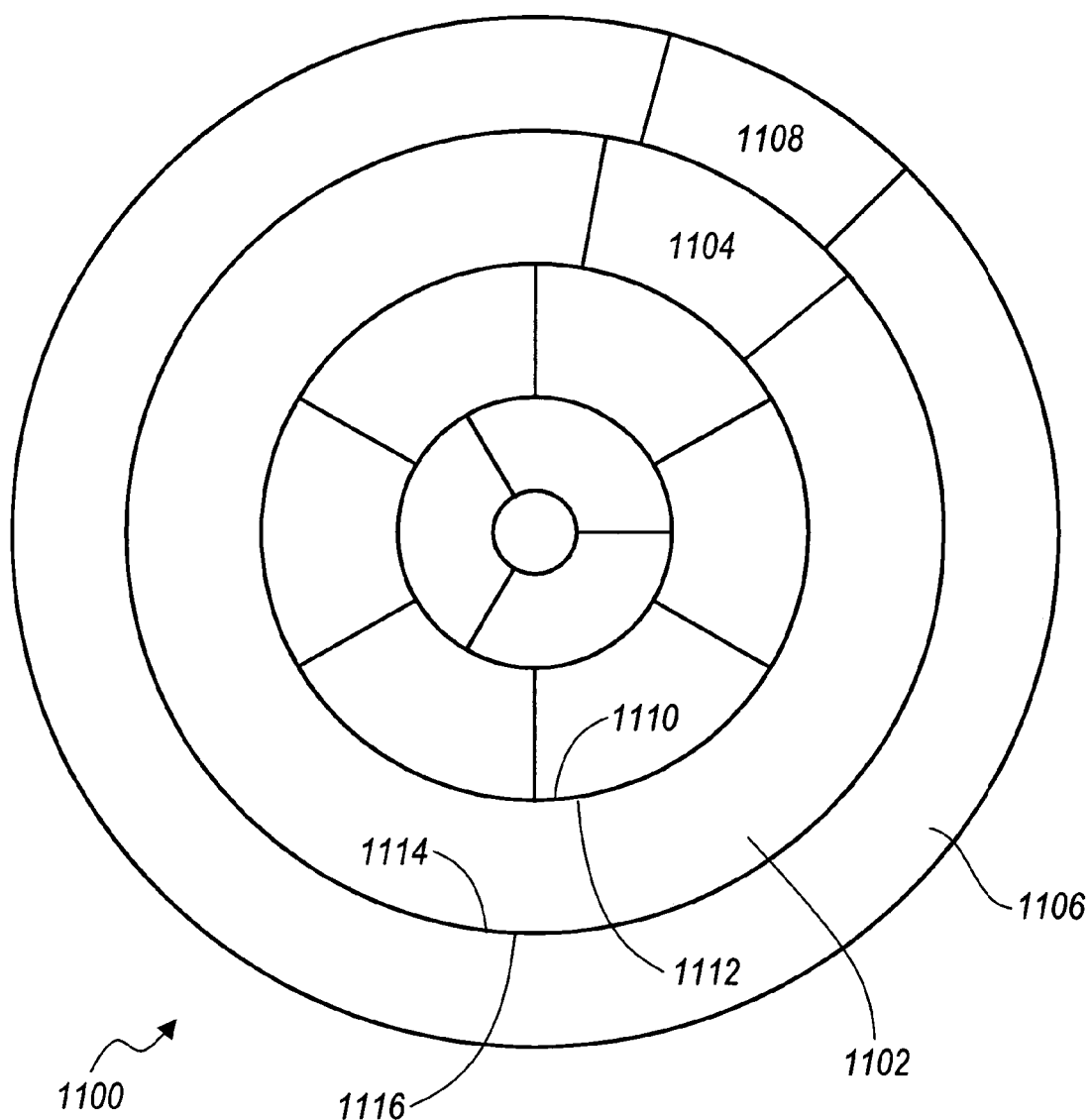
FIG. 18 is a plan view of a twelve-foot media disk of the present invention, wherein for clarity some of the respective segment boundaries are not shown, in accordance with a seventh alternative embodiment of the present invention.

Because it is sometimes necessary to provide media disks having even relatively larger diameters, e.g., larger than the six-foot media disk depicted in FIG. 16, it is sometimes necessary to connect multiple adjacent media elements together in a manner that will greatly increase the overall diameter of the media disk. Preferably, this should be done in a manner so as to impart stability and rigidity to the media disk as a whole, as well as to lessen or eliminate any "floppiness" therein. Accordingly, these additional media elements should be comprised of materials as previously described. Referring to FIG. 18, there is shown a twelve-foot media disk 1100 of the present invention using a similar six-foot disk depicted in FIG. 16 and adding representative areas for the six to nine foot interlocking media elements 1102, 1104, respectively, and the nine to twelve foot interlocking media elements 1106, 1108, respectively, in accordance with a seventh alternative embodiment of the present invention. Of course, the media elements 1102, 1104, 1106, 1108, respectively, would be provided with the same type of grid support, segment connection portions, projection members, disk connection members, and the like, as in previously described embodiments, the same being omitted for clarity purposes. As with the previously described embodiments, the respective additional media elements are preferably joined along their mating curved connection portions 1110, 1112, 1114, 1116, respectively, as described in previous embodiments (e.g., connection members received in corresponding apertures). Additionally, the six to nine and nine to twelve foot interlocking media elements 1102, 1104, 1106, 1108, respectively, can be provided with apertures (not shown for clarity purposes) for receiving support shafts (not shown for clarity purposes).

Figure 19:
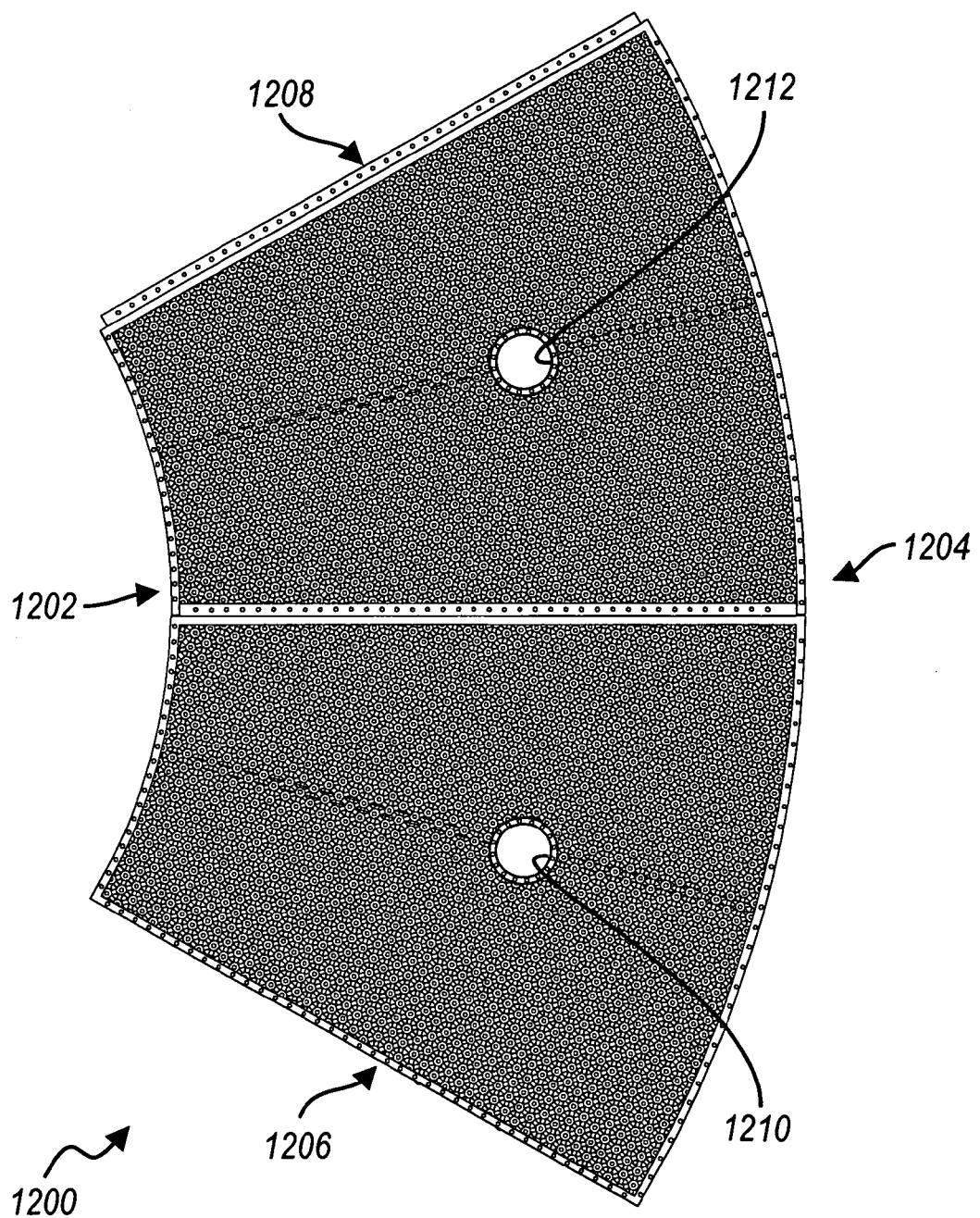
FIG. 19 is a plan view of a six-foot media disk segment, in accordance with an eighth alternative embodiment of the present invention.

Referring to FIG. 19, there is shown a six-foot media element 1200, in accordance with an eighth alternative embodiment of the present invention. As with the embodiment of FIG. 17, this media element 1200 is also comprised of a unitary member that is roughly equivalent to two individual media elements of similar size and curvature. In this manner, fewer discrete media elements are required to form a media disk (e.g., six media elements versus twelve media elements). It should be appreciated that the six-foot media element 1200 is preferably configured with two curved connection portions 1202, 1204, respectively, and two straight connection portions 1206, 1208, respectively. In this view, two apertures 1210, 1212, respectively, are provided for accepting any corresponding support shafts. However, it should be appreciated that either less than or more than this number of apertures can be provided. Although the apertures 1210, 1212, respectively, are shown as being substantially cylindrical, it should be appreciated that other configurations can be used in the practice of the present invention, such as but not limited to squares, rectangles, triangles, ovals, and the like. The degree of curvature of the curved connection portions 1202, 1204 will vary, depending, in part, on the exact configuration of the media disk to be assembled. It should be appreciated though, that if multiple rings of media elements are employed, the respective mating curved connection portions should be compatible with respect to their respective curvatures.

It should be appreciated that the present invention also envisions the use of media disks having diameters that are smaller than three feet and greater than twelve feet, as well as the various three feet to twelve feet embodiments specifically disclosed herein.

With respect to the operation of the system 10, the media of the present invention takes direct advantage of the direction of the washing force of the pool of wastewater. The base of the media disk acts as a rigid mesh which is cleaned by the shear force of the water as it passes through. The projecting elements are perpendicular to the direction of rotation and are thus perpendicular to the direction of flow through the wastewater. This orientation presents the maximum surface area to the wastewater it is passing through and thus induces the maximum velocity to the fluid flowing over the projections. This velocity of flow controls the thickness of the biomass attached to the projections and also reduces the chance of biomass webs forming between adjacent projections.

The foregoing description and the Figures show that the various embodiments of the present invention are well suited to fulfill their objectives and achieve the advantages stated above. It is recognized that those skilled in the art may make various modifications or additions to the exemplary embodiments chosen to illustrate the present invention without departing from the spirit and proper scope of the invention. For example, the size of the overall devices and/or assemblies and/or the components (that is, parts) thereof can be varied in somewhat different arrangements for the connecting the sheets together and/or supporting the various parts or components and may be utilized for accomplishing many of the same basic objectives and advantages. Most of the components or parts shown can be made of various plastics, ceramics, selected metals or any other suitable moldable, machinable and/or formable material known or used for wastewater media or rotating biomass support structures. Accordingly, it is to be understood that the protection that is to eventually be sought through the patent system and to be afforded hereby should be deemed to extend to novel and unobvious aspects of the subject matter disclosed herein, including all fair equivalents thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotating biological contactor system, comprising:
    a substantially circular first media disk, comprising:
        a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on the first straight edge portion; and
        a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on the second straight edge portion;
    wherein the first and second media segments are operable to be brought into selective engagement by coplanar direct mating of the first and second straight edge portions;
    wherein an area defining a substantially circular third aperture is formed along a central axis of the first media disk when the first and second media segments are brought into selective engagement; and
    a substantially circular second media disk, comprising:
        a third media segment having first and second major faces, the third media segment having a third curved edge portion and a third straight edge portion, the third media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on the third straight edge portion; and
        a fourth media segment having first and second major faces, the fourth media segment having a fourth curved edge portion and a fourth straight edge portion, the fourth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on the fourth straight edge portion;
    wherein the third end fourth media segments are operable to be brought into selective engagement by coplanar direct mating of the third and fourth straight edge portions;
    wherein an area defining a substantially circular sixth aperture is formed along a central axis of the second media disk when the third and fourth media segments are brought into selective engagement;
    wherein the tip portions of the second plurality of members of the first media disk are operable to be received in the socket portions of the second plurality of members of the second media disk.

2. The invention according to claim 1, further comprising first and second end plate members, wherein the first and second end plate members envelope the first and second media disks.

3. The invention according to claim 1, further comprising a substantially circular support shaft member operable to be received through either the first, second, fourth and fifth apertures.

4. The invention according to claim 1, further comprising a selectively rotatable substantially circular shaft member operable to be received through the third and sixth apertures.

5. The invention according to claim 1, wherein any of the first, second, third, and fourth connection portions comprise an area defining a bore.

6. The invention according to claim 1, wherein any of the first, second, third, and fourth connection portions comprise a connection member.

7. The invention according to claim 1, wherein any of the first and second media disks include a discontinuous surface.

8. The invention according to claim 1, wherein any of the first and second media disks include a grid structure.

9. The invention according to claim 1, wherein any of the first and second media disks are comprised of a substantially rigid material.

10. The invention according to claim 1, wherein any of the first and second media disks have a diameter up to about 12 feet.

11. A rotating biological contactor system, comprising:
    a substantially circular first media disk, comprising:
        a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on the first straight edge portion;
        a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on the second straight edge portion; and a third media segment having first and second major faces, the third media segment having a third curved edge portion and a third straight edge portion, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on the third curved edge portion;

wherein the first and second media segments are operable to be brought into selective engagement by mating of the first and second straight edge portions;

wherein the third media segment and any of the first and second media segments are operable to be brought into selective engagement by mating of the third curved edge portion with any of the first and second curved edge portions;

wherein an area defining a substantially circular third aperture is formed along a central axis of the first media disk when the first and second media segments are brought into selective engagement; and a substantially circular second media disk, comprising:

a fourth media segment having first and second major faces, the fourth media segment having a fourth curved edge portion and a fourth straight edge portion, the fourth media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on the fourth straight edge portion;

a fifth media segment having first and second major faces, the fifth media segment having a fifth curved edge portion and a fifth straight edge portion, the fifth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the fifth media segment having a fifth connection portion formed on the fifth straight edge portion; and a sixth media segment having first and second major faces, the sixth media segment having a sixth curved edge portion and a sixth straight edge portion, the first major face having first and second pluralities of members extending therefrom, the second plurality of members having a greater height than the first plurality of members, the second plurality of members having a tip portion and an area defining a socket portion formed in a base portion thereof, the sixth media segment having a sixth connection portion formed on the sixth curved edge portion;

wherein the third and fourth media segments are operable to be brought into selective engagement by mating of the third and fourth straight edge portions;

wherein the sixth media segment and any of the fourth and fifth media segments are operable to be brought into selective engagement by mating of the sixth curved edge portion with any of the fourth and fifth curved edge portions;

wherein an area defining a substantially circular sixth aperture is formed along a central axis of the second media disk when the third and fourth media segments are brought into selective engagement;

wherein the tip portions of the second plurality of members of the first media disk are operable to be received in the socket portions of the second plurality of members of the second media disk.

12. The invention according to claim 11, further comprising first and second end plate members, wherein the first and second end plate members envelope the first and second media disks.

13. The invention according to claim 11, further comprising a substantially circular support shaft member operable to be received through either the first, second, fourth, and fifth apertures.

14. The invention according to claim 11, further comprising a selectively rotatable substantially circular shaft member operable to be received through the third and sixth apertures.

15. The invention according to claim 11, wherein any of the first, second, third, fourth, fifth, and sixth connection portions comprise an area defining a bore.

16. The invention according to claim 11, wherein any of the first, second, third, fourth, fifth, and sixth connection portions comprise a connection member.

17. The invention according to claim 11, wherein any of the first and second media disks include a discontinuous surface.

18. The invention according to claim 11, wherein any of the first and second media disks include a grid structure.

19. The invention according to claim 11, wherein any of the first and second media disks are comprised of a substantially rigid material.

20. The invention according to claim 11, wherein any of the first and second media disks have a diameter up to about 12 feet.

21. A rotating biological contactor system, comprising:

a substantially circular first media disk, comprising:

a first media segment having first and second major faces, the first media segment having a first curved edge portion and a first straight edge portion, the first media segment having an area defining a substantially circular first aperture formed therein, the first major face having first and second pluralities of members extending therefrom, the second plurality of members having a greater height than the first plurality of members, the second plurality of members having a tip portion and an area defining a socket portion formed in a base portion thereof, the first media segment having a first connection portion formed on the first straight edge portion;

a second media segment having first and second major faces, the first media segment having a second curved edge portion and a second straight edge portion, the second media segment having an area defining a substantially circular second aperture formed therein, the first major face having first and second pluralities of members extending therefrom, the second plurality of members having a greater height than the first plurality of members, the second plurality of members having a tip portion and an area defining a socket portion formed in a base portion thereof, the second media segment having a second connection portion formed on the second straight edge portion;

a third media segment having first and second major faces, the third media segment having a third curved edge portion and a third straight edge portion, the first major face having first and second pluralities of members extending therefrom, the second plurality of members having a greater height than the first plurality of members, the second plurality of members having a tip portion and an area defining a socket portion formed in a base portion thereof, the third media segment having a third connection portion formed on the third curved edge portion; and a fourth media segment having first and second major faces, the fourth media segment having a fourth curved edge portion and a fourth straight edge portion, the first major face having first and second pluralities of members extending therefrom, the second plurality of members having a greater height than the first plurality of members, the second plurality of members having a tip portion and an area defining a socket portion formed in a base portion thereof, the fourth media segment having a fourth connection portion formed on the fourth curved edge portion;

wherein the first and second media segments are operable to be brought into selective engagement by mating of the first and second straight edge portions;

wherein the third and fourth media segments are operable to be brought into selective engagement by mating of the third and fourth straight edge portions;

wherein any of the third and fourth media segments and any of the fist and second media segments are operable to be brought into selective engagement by mating of any of the third and fourth curved edge portions with any of the first and second curved edge portions;

wherein an area defining a substantially circular third aperture is formed along a central axis of the first media disk when the first and second media segments are brought into selective engagement; and a substantially circular second media disk, comprising:

a fifth media segment having first and second major faces, the fifth media segment having a fifth curved edge portion and a fifth straight edge portion, the fifth media segment having an area defining a substantially circular fourth aperture formed therein, the first major face having first and second pluralities of members extending therefrom, the second plurality of members having a greater height than the first plurality of members, the second plurality of members having a tip portion and an area defining a socket portion formed in a base portion thereof, the fifth media segment having a fifth connection portion formed on the fifth straight edge portion;

a sixth media segment having first and second major faces, the sixth media segment having a sixth curved edge portion and a sixth straight edge portion, the sixth media segment having an area defining a substantially circular fifth aperture formed therein, the first major face having first and second pluralities of members extending therefrom, the second plurality of members having a greater height than the first plurality of members, the second plurality of members having a tip portion and an area defining a socket portion formed in a base portion thereof, the sixth media segment having a sixth connection portion formed on the sixth straight edge portion;

a seventh media segment having first and second major faces, the seventh media segment having a seventh curved edge portion and a seventh straight edge portion, the first major face having first and second pluralities of members extending therefrom, the second plurality of members having a greater height than the first plurality of members, the second plurality of members having a tip portion and an area defining a socket portion formed in a base portion thereof, the seventh media segment having a seventh connection portion formed on the seventh curved edge portion; and an eighth media segment having first and second major faces, the eight media segment having an eighth curved edge portion and an eighth straight edge portion, the first major face having first and second pluralities of members extending therefrom, the second plurality of members having a greater height than the first plurality of members, the second plurality of members having a tip portion and an area defining a socket portion formed in a base portion thereof, the eighth media segment having an eight connection portion formed on the eighth curved edge portion;

wherein the fifth and sixth media segments are operable to be brought into selective engagement by mating of the fifth and sixth straight edge portions;

wherein the seventh and eighth media segments are operable to be brought into selective engagement by mating of the seventh and eighth straight edge portions;

wherein any of the seventh and eighth media segments and any of the fifth and sixth media segments are operable to be brought into selective engagement by mating of any of the seventh and eighth curved edge portions with any of the fifth and sixth curved edge portions;

wherein an area defining a substantially circular sixth aperture is formed along a central axis of the second media disk when the third and fourth media segments are brought into selective engagement;

wherein the tip portions of the second plurality of members of the first media disk are operable to be received in the socket portions of the second plurality of members of the second media disk.

22. The invention according to claim 21, further comprising first and second end plate members, wherein the first and second end plate members envelope the first and second media disks.

23. The invention according to claim 21, further comprising a substantially circular support shaft member operable to be received through either the first, second, fourth and fifth apertures.

24. The invention according to claim 21, further comprising a selectively rotatable substantially circular shaft member operable to be received through the third and sixth apertures.

25. The invention according to claim 21, wherein any of the first, second, third, fourth, fifth, sixth, seventh, and eight connection portions comprise an area defining a bore.

26. The invention according to claim 21, wherein any of the first, second, third, fourth, fifth, sixth, seventh, and eight connection portions comprise a connection member.

27. The invention according to claim 21, wherein any of the first and second media disks include a discontinuous surface.

28. The invention according to claim 21, wherein any of the first and second media disk include a grid structure.

29. The invention according to claim 21, wherein any of the first and second media disk are comprised of a substantially rigid material.

30. The invention according to claim 21, wherein any of the first and second media disk have a diameter up to about 12 feet.

* * * * *

UNITED STATES PATENT AND TRADEMARK OFFICE
CERTIFICATE OF CORRECTION

| | | |
|---|---|---|
| PATENT NO. | : 7,156,986 B2 | Page 1 of 1 |
| APPLICATION NO. | : 10/997117 | |
| DATED | : January 2, 2007 | |
| INVENTOR(S) | : Theodore U. Warrow | |

It is certified that error appears in the above-identified patent and that said Letters Patent is hereby corrected as shown below:

In Column 16, Line 9, Claim 1, please delete "end" and please insert --and--.

In Column 20, Line 24, Claim 21, please delete "eight" and please insert --eighth--.

In Column 20, Line 32, Claim 21, please delete "eight" and please insert --eighth--.

In Column 21, Line 2, Claim 25, please delete "eight" and please insert --eighth--

In Column 21, Line 6, Claim 26, please delete "eight"" and please insert --eighth--.

Signed and Sealed this

Tenth Day of April, 2007

JON W. DUDAS
*Director of the United States Patent and Trademark Office*